US010548103B2

(12) United States Patent
Yasukawa et al.

(10) Patent No.: US 10,548,103 B2
(45) Date of Patent: Jan. 28, 2020

(54) USER APPARATUS AND SIGNAL SYNCHRONIZATION METHOD

(71) Applicant: NTT DOCOMO, INC., Tokyo (JP)

(72) Inventors: Shimpei Yasukawa, Tokyo (JP); Satoshi Nagata, Tokyo (JP); Qun Zhao, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/751,053

(22) PCT Filed: Aug. 10, 2016

(86) PCT No.: PCT/JP2016/073612
§ 371 (c)(1),
(2) Date: Feb. 7, 2018

(87) PCT Pub. No.: WO2017/026518
PCT Pub. Date: Feb. 16, 2017

(65) Prior Publication Data
US 2018/0234928 A1    Aug. 16, 2018

(30) Foreign Application Priority Data

Aug. 13, 2015  (JP) .................................. 2015-159989
Nov. 5, 2015   (JP) .................................. 2015-218010

(51) Int. Cl.
*H04B 7/00* (2006.01)
*H04W 56/00* (2009.01)
(Continued)

(52) U.S. Cl.
CPC ........... *H04W 56/001* (2013.01); *H04W 4/40* (2018.02); *H04W 56/002* (2013.01); *H04W 92/20* (2013.01)

(58) Field of Classification Search
CPC ............ H04W 56/00; H04W 56/0015; H04W 56/002; H04W 56/0025
(Continued)

(56) References Cited

U.S. PATENT DOCUMENTS 9,609,503 B2 *  3/2017  Ro .......................... H04W 8/005
10,021,536 B2 *  7/2018  Morita ................... H04W 72/10
(Continued)

FOREIGN PATENT DOCUMENTS

JP      2014-127993 A    7/2014
JP      2016-534604 A   11/2016
(Continued)

OTHER PUBLICATIONS

International Search Report of the International Searching Authority issued in PCT/JP2016/073612 dated Nov. 1, 2016 (4 pages).
(Continued)

Primary Examiner — Dmitry Levitan
(74) Attorney, Agent, or Firm — Osha Liang LLP

(57) ABSTRACT

There is provided a user apparatus of a radio communication system supporting D2D communication, the user apparatus including a receiver configured to receive a signal of an external synchronization source, a synchronization signal transmitted from a base station, or a synchronization signal transmitted from another user apparatus; and a synchronization processor configured to execute, in accordance with priority information indicating priority order of signals used for synchronization, radio frame synchronization and frequency synchronization using any one of the signal of the external synchronization source, the synchronization signal transmitted from the base station, or the synchronization signal transmitted from the other user apparatus, which is received by the receiver.

7 Claims, 26 Drawing Sheets

(51) Int. Cl.
*H04W 4/40* (2018.01)
*H04W 92/20* (2009.01)

(58) Field of Classification Search
USPC ........ 370/310, 315, 324, 328, 336, 345, 503
See application file for complete search history.

(56) References Cited

U.S. PATENT DOCUMENTS

| | | |
|---|---|---|
| 2015/0215763 A1 | 7/2015 | Ro et al. |
| 2015/0264588 A1* | 9/2015 | Li .................... H04W 56/0015 370/350 |
| 2016/0212594 A1 | 7/2016 | Morita et al. |
| 2016/0374038 A1 | 12/2016 | Wang |
| 2016/0374039 A1* | 12/2016 | Khoryaev ......... H04W 56/0015 |
| 2017/0006563 A1* | 1/2017 | Lindoff ............... H04W 56/001 |
| 2017/0295248 A1* | 10/2017 | Fujishiro ............... H04W 56/00 |
| 2018/0124707 A1* | 5/2018 | Lee ....................... H04W 52/10 |
| 2018/0199299 A1* | 7/2018 | Wakabayashi ...... H04W 56/002 |

FOREIGN PATENT DOCUMENTS

| | | |
|---|---|---|
| WO | 2015/010542 A1 | 1/2015 |
| WO | 2015/046264 A1 | 4/2015 |
| WO | 2015115974 A1 | 8/2015 |
| WO | 2015116940 A1 | 8/2015 |

OTHER PUBLICATIONS

Written Opinion of the International Searching Authority issued in PCT/JP2016/073612 dated Nov. 1, 2016 (6 pages).
Balazs Bertenyi, "Key drivers for LTE success: Services Evolution"; 3GPP Seminar, LTE Asia; Sep. 6, 2011 (15 pages).
Extended European Search Report issued in corresponding European Application No. 16835215.1, dated May 22, 2018 (9 pages).
Office Action issued in counterpart Japanese Patent Application No. 2017-534488, dated Jul. 10, 2018 (9 Pages).

* cited by examiner

FIG.6

| PRIORITY | TYPE OF SYNCHRONIZATION SOURCE |
|---|---|
| 1 | GPS SIGNAL |
| 2 | SS |
| 3 | SLSS (GPS sync.) |
| 4 | SLSS (NW sync.) |
| 5 | SLSS (No sync.) |

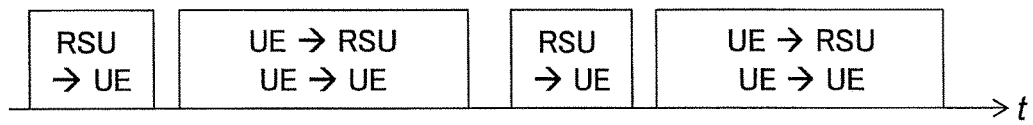

| PRIORITY | SYNCHRONIZATION SOURCE |
|---|---|
| 1 | GPS SIGNAL |
| 2 | SS |
| 3 | SLSS (GPS sync.)_RSU |
| 4 | SLSS (NW sync.)_RSU |
| 5 | SLSS (No sync.) _RSU |
| 6 | SLSS (GPS sync.) |
| 7 | SLSS (NW sync.) |
| 8 | SLSS (No sync.) |

| PRIORITY | TYPE OF SLSS |
|---|---|
| 1 | SLSS_A |
| 2 | SLSS_B |
| 3 | SLSS_C |
| 4 | SLSS_D |
| 5 | SLSS_E |
| ⋮ | ⋮ |

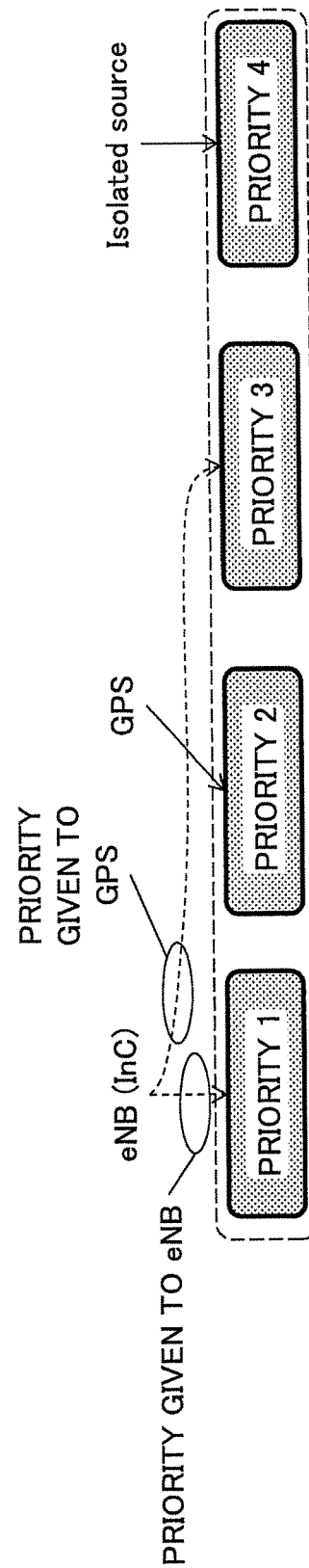

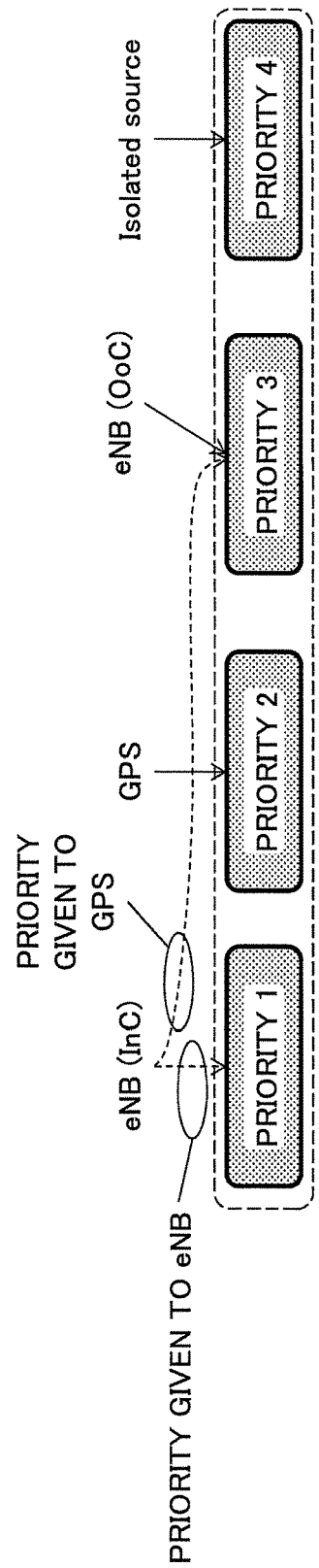

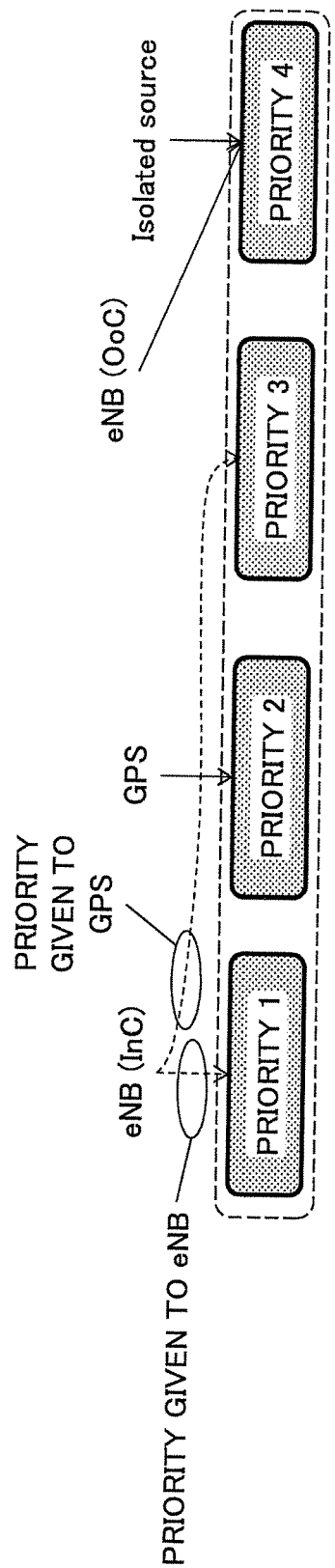

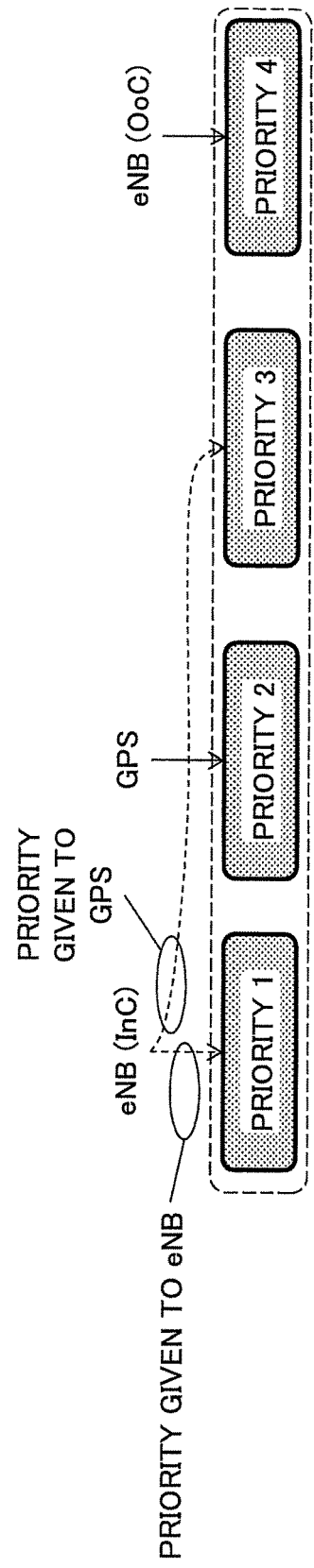

FIG.19A

| PRIORITY | SYNCHRONIZATION SOURCE |
|---|---|
| 1 | GPS SIGNAL |
| 2 | SLSS (GPS sync.) |
| 3 | SLSS (GPS sync.relay) |
| 4 | SLSS (NW sync.) |
| 5 | SLSS (NW sync.relay) |
| 6 | SLSS (No sync.) |

FIG.19B

| PRIORITY | SYNCHRONIZATION SOURCE |
|---|---|
| 1 | GPS SIGNAL |
| 2 | SLSS (GPS sync.) |
| 3 | SLSS (GPS sync.relay) |
| 4 | SLSS (No sync.) |

DIFFERENT SLSS ID

DIFFERENT SUBFRAME OFFSET

USER APPARATUS AND SIGNAL SYNCHRONIZATION METHOD

TECHNICAL FIELD

The present invention relates to a user apparatus, and a signal synchronization method.

BACKGROUND ART

In LTE (Long Term Evolution) and a successor system of LTE (e.g., also called LTE-A (LTE-Advanced), FRA (Future Radio Access), 4G, etc.), a D2D (Device to Device) technology that performs direct communications between user terminals without having intervention by a radio base station has been studied (e.g., Non-Patent Document 1).

The D2D technology may be able to reduce the traffic between the user apparatuses and the base station and to enable communications between the user apparatuses even when the base station is no longer able to provide communication services at the time of disaster or the like.

The D2D technology is roughly divided into a D2D discovery (also referred to as D2D discovery, D2D direction) for finding other communicative user terminals and a D2D communication (also referred to as a D2D direct communication, D2D communication, an inter-terminal direct communication, etc.) for performing direct communications between the terminals. In the following, when the D2D communication, the D2D discovery, etc., are not particularly distinguished, they are simply called "D2D". Further, a signal transmitted and received by the D2D is called a D2D signal.

In 3GPP (3rd Generation Partnership Project), it is being studied to implement V2X by extending the D2D function. Note that the V2X is a part of ITS (Intelligent Transport Systems), and is a generic name of a V2V (Vehicle to Vehicle) indicating a communication mode executed between vehicles, a V2I (Vehicle to Infrastructure: roadside-to-vehicle communication) indicating a communication mode executed between a vehicle and a road-side unit (RSU: Road-Side Unit) installed at a roadside, a V2N (Vehicle to Nomadic device: device-to-vehicle communication) indicating form a communication mode executed between a vehicle and a mobile terminal of a driver, and a V2P (Vehicle to Pedestrian: pedestrian communication) indicating a communication mode executed between the vehicle and the mobile terminal of a pedestrian, as illustrated in FIG. 1.

RELATED ART DOCUMENT

Non-Patent Document

[NON-PATENT DOCUMENT 1] "Key drivers for LTE success: Services Evolution", September 2011, 3GPP, the Internet URL: www.3gpp.org

SUMMARY OF THE INVENTION

Problem to be Solved by the Invention

For a user apparatus that is mainly installed in a vehicle in V2X, for example, a highly accurate GPS receiver can be installed, and battery energy consumption caused by constantly receiving GPS signals is not considered to be a serious problem in many cases.

Further, the user apparatus needs to synchronize a radio frame and the frequency with those of the base station and another user apparatus in order to communicate with the base station or the other user apparatus. However, when the user apparatuses that are located mainly outside the coverage perform the D2D communications, a synchronization process needs to be performed using respective clocks inside the user apparatuses, which may degrade synchronization accuracy.

If the synchronization process is performed by using an external synchronization source such as a satellite positioning system typically represented by a GPS signal, it may be possible to enhance the synchronization accuracy by using the external synchronization source outside the coverage. Even within the coverage, the synchronization accuracy may be enhanced by the use of the external synchronization source.

However, in the D2D according to related art, a technique is not defined that is for performing, in the user apparatus, a synchronization process using an external synchronization source other than a synchronization signal defined by the D2D.

The disclosed technology is developed in view of the above, and an object is to provide a technique that allows, in D2D communications, a synchronization process using an external synchronization source.

Means for Solving the Problem

The user apparatus according to the disclosed technology is a user apparatus of a radio communication system supporting D2D communications, the user apparatus including a receiver configured to receive a signal of an external synchronization source, a synchronization signal transmitted from a base station, or a synchronization signal transmitted from another user apparatus; and a synchronization processor configured to execute, in accordance with priority information indicating priority order of signals used for synchronization, radio frame synchronization and frequency synchronization using any one of the signal of the external synchronization source, the synchronization signal transmitted from the base station, or the synchronization signal transmitted from the other user apparatus, which is received by the receiver.

Advantageous Effect of the Present Invention

According to the disclosed technology, a technique is provided that allows, in D2D communications, a synchronization process using an external synchronization source.

BRIEF DESCRIPTION OF THE DRAWINGS

FIG. 6 is a diagram illustrating an example of priority information;

FIG. 9 is a diagram showing an example of a radio resource allocation method using UTC;

FIG. 10A is a diagram illustrating a modified example of an SLSS (GPS sync.);

FIG. 10B is a diagram illustrating a modified example of an SLSS (GPS sync.);

FIG. 15D is a diagram illustrating an example of the correspondence relationship between the synchronization source and the SLSS;

FIG. 17C is a diagram illustrating an example of the correspondence relationship between the synchronization source and the SLSS;

FIG. 17D is a diagram illustrating an example of the correspondence relationship between the synchronization source and the SLSS;

FIG. 17E is a diagram illustrating an example of the correspondence relationship between the synchronization source and the SLSS;

FIG. 19A is a diagram illustrating an example of the priority information;

FIG. 19B is a diagram illustrating an example of the priority information;

EMBODIMENTS OF THE INVENTION

The following describes embodiments of the present invention with reference to the accompanying drawings. Note that the embodiments described below are merely examples and the embodiments to which the present invention is applied are not limited to the following embodiments. For example, it is assumed that a radio communication system according to an embodiment conforms to the LTE standard. However, the present invention may be applied not limited to LTE but may also be applied to other systems. Note that, in the specification and the claims, the "LTE" is used in broad meaning including, not only a communication scheme corresponding to 3GPP release 8 or 9, but also release 10, 11, 12, and 13 of the 3GPP, or fifth-generation mobile communication schemes corresponding to on and after release 14 of the 3GPP.

The following illustrates an example in which GPS is used as an external synchronization source; however, the present embodiment is not limited to the GPS, and the present embodiment may be applied to a case in which radio, television, or WiFi (registered trademark) etc., is used as an external synchronization source. Further, GPS is used synonymously with GNSS (Global Navigation Satellite System).

<Outline>

Figure 1:
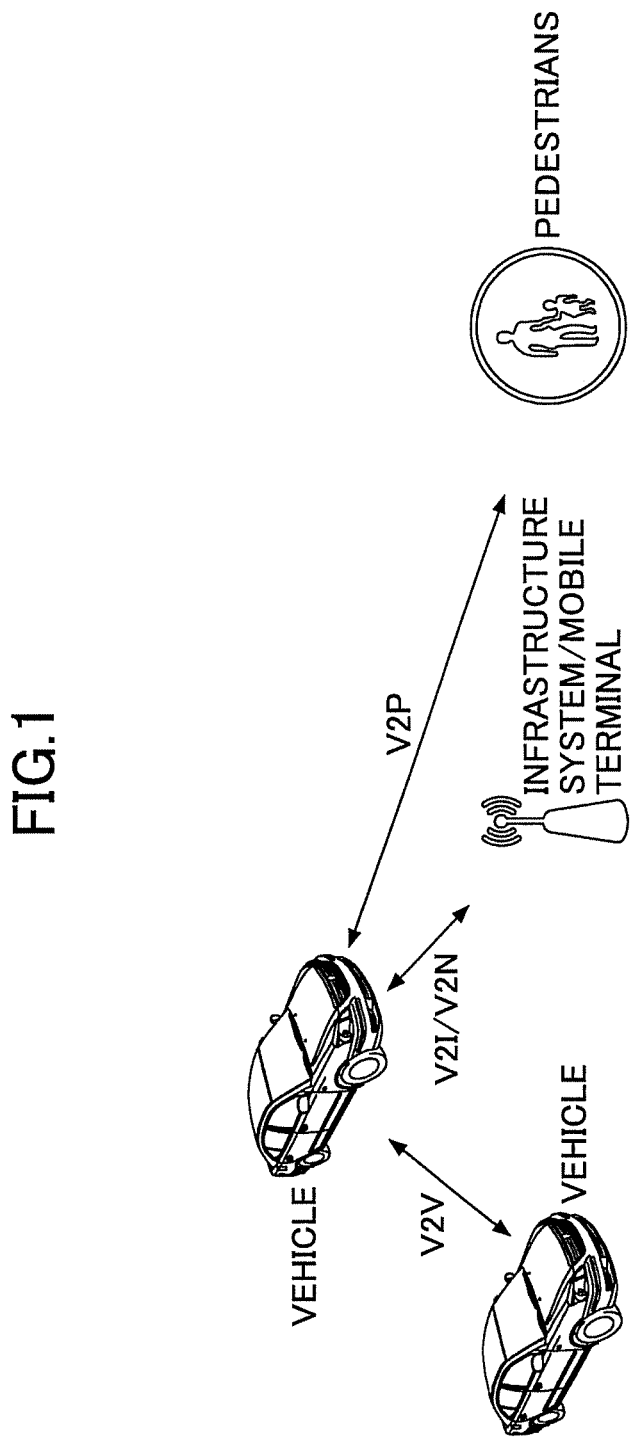
FIG. 1 is a diagram illustrating V2X.
Figure 2:
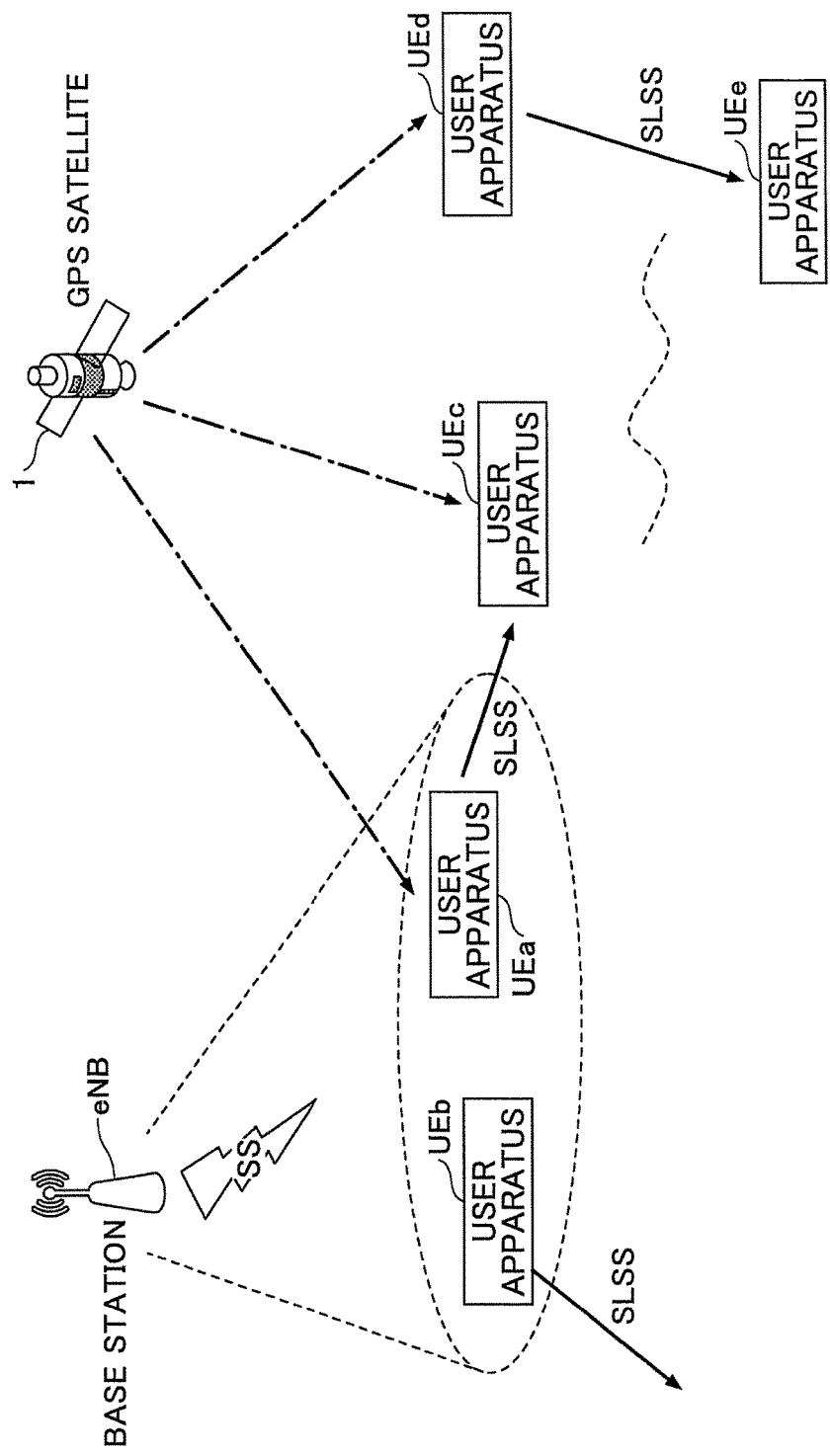
FIG. 2 is a diagram illustrating a configuration example of a radio communication system according to an embodiment.

As illustrated in FIG. 2, a radio communication system according to an embodiment includes a GPS satellite 1, a base station eNB, and user apparatuses UEa to UEe.

The base station eNB transmits a synchronization signal (SS: Synchronization Signal) to the user apparatus UE. More specifically, the SS is a PSS (Primary Synchronization Signal) and an SSS (Secondary Synchronization Signal).

The GPS satellite 1 transmits a GPS signal toward the ground. The GPS signal includes information specifying UTC (Coordinated Universal Time).

The user apparatuses UEa to UEe are provided with functions to execute D2D communications with each other. In the following description, any user apparatus of the user apparatuses (UEa to UEe) is referred to as a "user apparatus UE".

Here, usual D2D communication is described. In the D2D communication, a part of uplink resources already defined as resources for transmitting an uplink signal from the user apparatus UE to the base station eNB is used, and, within the coverage, D2D signals are transmitted and received in synchronization with the SS transmitted by the base station eNB.

Furthermore, in order to implement the D2D communication outside the coverage, it is specified that the user apparatus UE transmits (relays) a synchronization signal (SLSS: SideLink Synchronization Signal) when a predetermined condition is satisfied. More specifically, the SLSS is a PSSS (Primary Sidelink Synchronization Signal) and an SSS (Secondary Sidelink Synchronization Signal). In addition, the user apparatus UE that transmits the SLSS is able to transmit a radio frame number (DFN: Direct Frame Number), a system bandwidth, etc., to a user apparatus UE that exists outside the coverage, by using a physical channel called a "PSBCH" (Physical Sidelink Broadcast Control Channel).

By transmitting (relaying), by a user apparatus UE located within a coverage, the SLSS based on a synchronization timing of the base station eNB, a user apparatus UE located outside the coverage is also allowed to execute D2D communication in accordance with the synchronization timing of the base station eNB. A user apparatus UE isolated outside the coverage (i.e., a user apparatus UE unsynchronized with the SS and SLSS) transmits a SLSS based on a clock generated by an oscillator included inside the user apparatus UE, so as to align synchronization timing with that of another user apparatus UE.

Figure 3A:
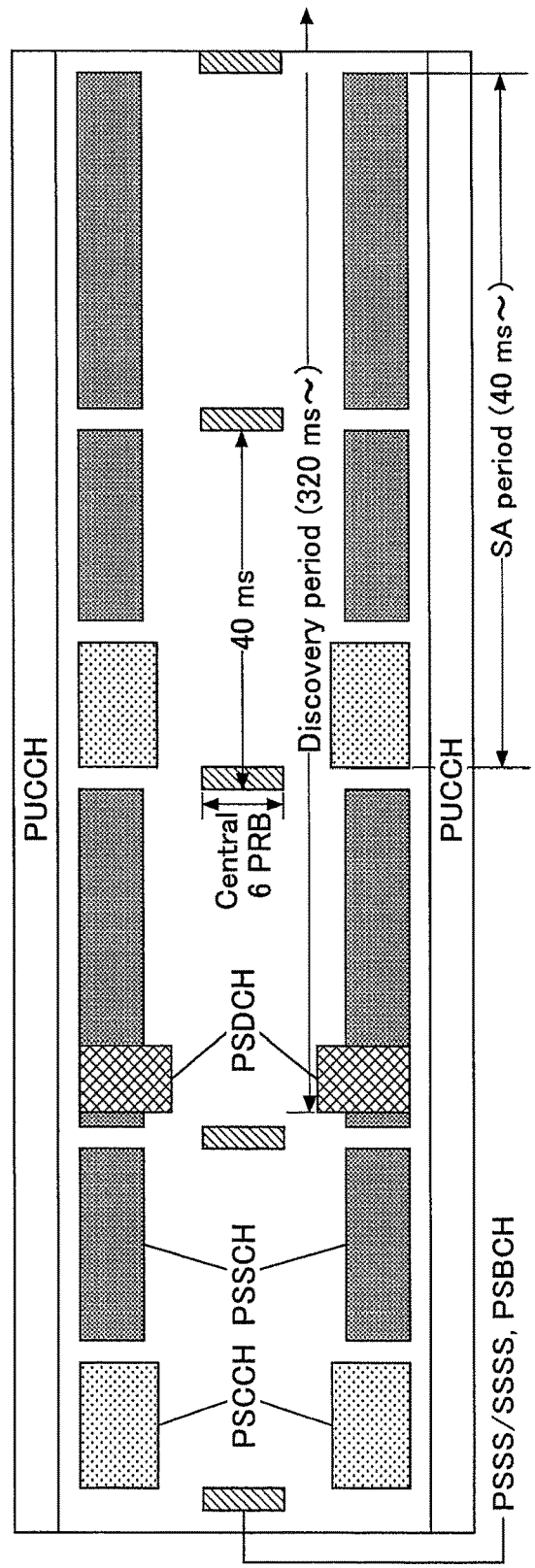
FIG. 3A is a diagram illustrating a physical channel specified in D2D.
Figure 3B:
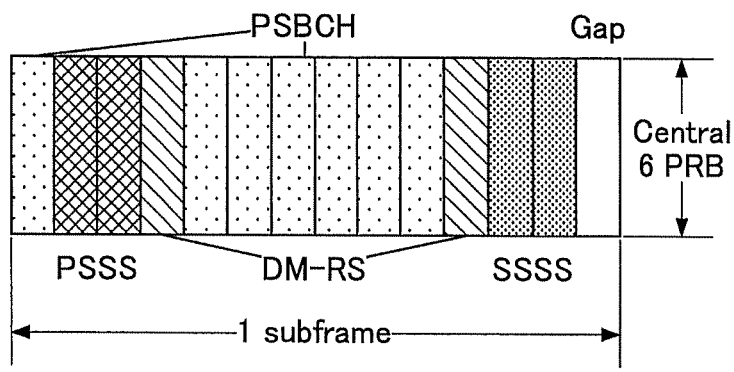
FIG. 3B is a diagram illustrating a physical channel specified in D2D.

Next, the SLSS and PSBCH defined in D2D are described. FIG. 3A illustrates a configuration of an entire physical channel in D2D. FIG. 3B illustrates specific configurations of SLSS (PSSS/SSSS) and PSBCH.

As illustrated in FIG. 3B, in D2D, PSSS and SSSS are mapped to predetermined SC-FDMA symbols within one subframe at center 6 PRBs (Physical Resource Blocks) of the frequency band, and PSBCH is mapped to SC-FDMA symbols excluding the PSSS, SSSS and DM-RS (Demodulation-Reference Signal). As illustrated in FIG. 3A, the PSSS, SSSS and PSBCH are transmitted at 40 ms intervals. In FIG. 3A, PSDCH (Physical Sidelink Discovery Channel) is a physical channel used for the "D2D Discovery", PSCCH (Physical Sidelink Control Channel) is a physical channel for transmitting control information, such as SCI in the "D2D communication," and PSSCH (Physical Sidelink Shared Channel) is a physical channel for transmitting data in the "D2D communication."

Further, in usual D2D, two types of SLSSs are specified, which are an SLSS transmitted within a coverage and in the vicinity of the coverage (Partial coverage) and an SLSS transmitted outside the coverage. The PSSS transmitted within the coverage and in the vicinity of the coverage is a Zadoff-Chu sequence with a route index of "26," and an SLID (Sidelink ID) in a range from 0 to 167 is identified by the PSSS and the SSSS. The PSSS transmitted outside the coverage is a Zadoff-Chu sequence with a route index of "37", and an SLID in a range from 168 to 355 is identified by the PSSS and the SSSS. The "SLID" may also be called "SLSSID". Furthermore, an identifier called an in-coverage indicator is stored in the PSBCH, which is configured to be "1 (TRUE)" within the coverage, and is configured to be "0 (FALSE)" outside the coverage (including the vicinity of the coverage). Three types of priority groups (Priority Groups) are defined by a combination of the SLID and the In-coverage indicator. Specifically, when the SLID is from 0 to 167 and the In-coverage indicator is "1 (TRUE)," the priority group is defined to be a priority group 1; when the SLID is from 0 to 167 and the In-coverage indicator is "0 (FALSE)," the priority group is defined to be a priority group 2; and when the SLID is from 168 to 355 and the In-coverage indicator is "0 (FALSE)," the priority group is defined to be a priority group 3.

Further, in usual D2D, a priority order is defined that indicates which synchronization signal the user apparatus UE should synchronize when the user apparatus UE receives the SS, the SLSS transmitted within the coverage, and the SLSS transmitted outside the coverage. It is specified that the SS has a highest priority, the SLSS transmitted within the coverage has a second highest priority (Priority group 1), and the SLSS transmitted outside the coverage has a lowest priority (Priority 2 or 3).

Figure 4:
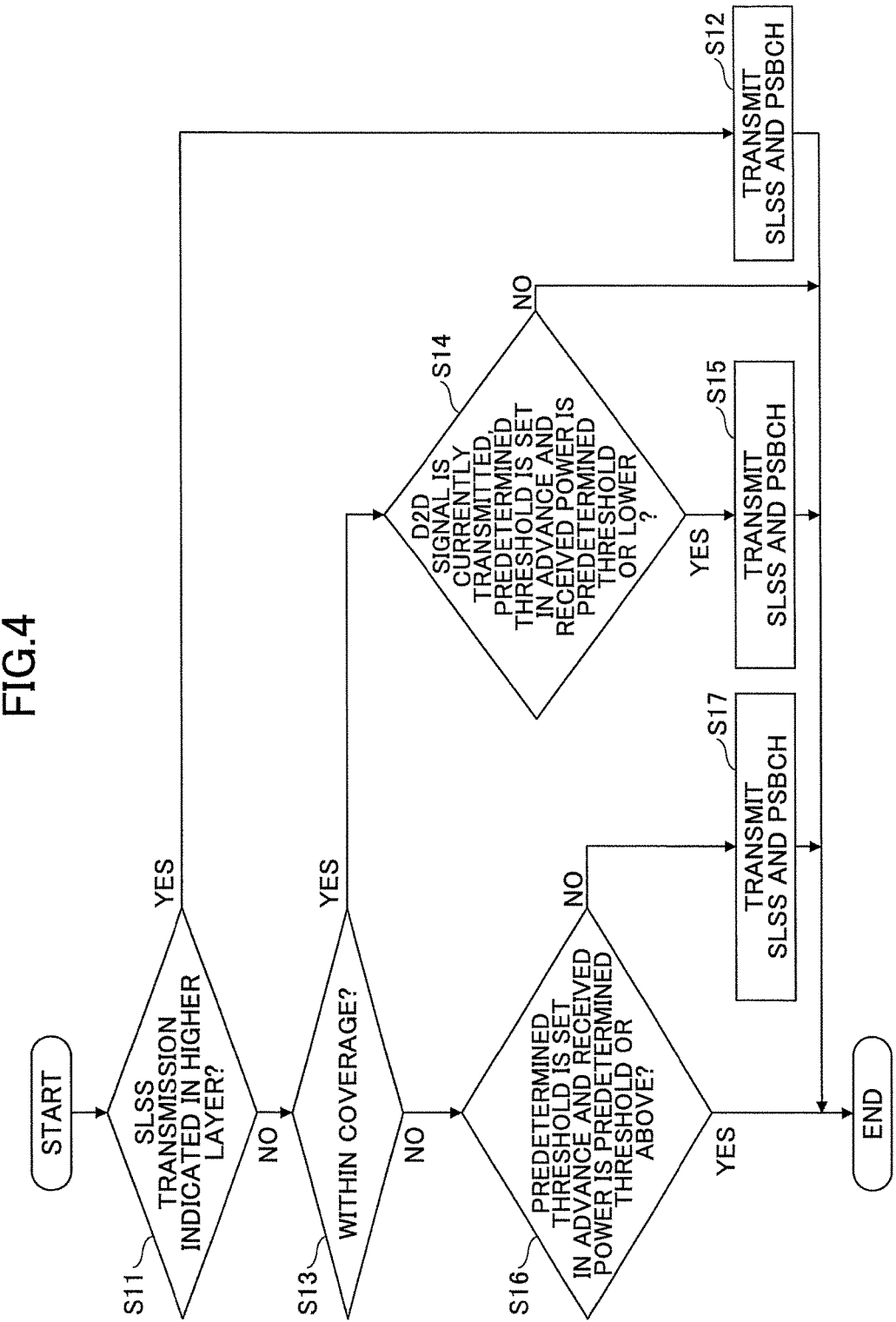
FIG. 4 is a flowchart illustrating an SLSS transmission trigger in usual D2D.

FIG. 4 is a flowchart illustrating an SLSS transmission trigger in usual D2D. The user apparatus UE is defined to transmit (relay) a synchronization signal when a predetermined condition is satisfied. More specifically, the user apparatus UE transmits SLSS and PSBCH when the condition illustrated in FIG. 4 is satisfied.

In step S11, the user apparatus UE verifies whether SLSS transmission is indicated in the higher layer (RRC, etc.). When the SLSS transmission is indicated, the process proceeds to step S12, whereas when the SLSS transmission is not indicated, the process proceeds to step S13.

In step S12, the user apparatus UE transmits SLSS and PSBCH. In step S12, the user apparatus UE is in a state in which the user apparatus UE is able to receive an indication from the higher layer (i.e., within the coverage), so that the user apparatus UE transmits the SLSS to be transmitted within the coverage and the PSBCH including the In-coverage indicator that is configured to be "1".

In step S13, the user apparatus UE verifies whether the user apparatus UE is located within the coverage. When the user apparatus UE is located within the coverage, the process proceeds to step S14, whereas when the user apparatus UE is located outside the coverage, the process proceeds to step S16.

In step S14, when the user apparatus UE is transmitting a D2D signal and a predetermined threshold (RSRP threshold for determining whether transmission of SLSS is necessary within coverage) is configured (reported) by SIB (System Information Block) or an RRC signal, the user apparatus UE determines whether the received power (RSRP) of the reference signal, etc., from the base station eNB is less than or equal to the predetermined threshold. When the received power is less than or equal to the predetermined threshold, the process proceeds to step S15. When the received power exceeds the predetermined threshold, when no D2D signal is transmitted, or when the predetermined threshold is not configured by an SIB or an RRC signal, the process is terminated. The user apparatus UE ends the process when the received power (RSRP) from the base station eNB is equal to or less than the predetermined threshold, the user apparatus UE is not transmitting a D2D signal, or the predetermined threshold is not set (reported) by SIB (System Information Block) or RRC signal.

In step S15, the user apparatus UE transmits the SLSS to be transmitted within the coverage and the PSBCH including the In-coverage indicator that is configured to be "1".

In step S16, when a predetermined threshold (S-RSRP (Sidelink-RSRP) threshold for determining whether transmission of SLSS is necessary outside the coverage) is configured by a SIB or an RRC signal, the user apparatus UE verifies whether the received power of the DM-RS associated with PSBCH is greater than or equal to the predetermined threshold. When the predetermined threshold is not configured or when the received power is greater than or equal to the predetermined threshold, the process is terminated. When the received power is less than the predetermined threshold (including a case where DM-RS associated with PSBCH is not detected), the process proceeds to step S17.

In step S17, the user apparatus UE transmits the SLSS to be transmitted in the vicinity of the coverage or outside the coverage and the PSBCH including the In-coverage indicator in which "0" is configured.

In FIG. 4, the process of step S14 is performed in order to verify whether the user apparatus UE is located at a position close to the cell edge (i.e., a position close to the outside of the coverage). That is, the user apparatuses UE are controlled such that only one or more user apparatuses UE located at one or more positions close to the cell edge are caused to transmit the SLSS, and one or more user apparatuses UE located at one or more positions close to the center of the cell is disallowed to transmit the SLSS. The process of step S16 is performed to verify whether another user apparatus UE that transmits PSBCH exists nearby. That is, the user apparatus UE transmits the SLSS in the process of step S17 when the user apparatus UE is in an isolated state or when a distance to the other user apparatus UE that transmits the PSBCH is large.

The user apparatus UE according to the present embodiment is able to perform synchronization using GPS signals in addition to the SS and the SLSS. For example, as illustrated in FIG. 2, the user apparatuses UEc and UEd located outside the coverage are unable to receive the SS from the base station eNB. Instead, the user apparatus UEc and UEd are able to receive GPS signals, and the user apparatuses UEc and UEd thus perform synchronization using the GPS signals.

Upon detecting multiple synchronization sources (SS, GPS signals, SLSS), the user apparatus UE performs synchronization using any one of the synchronization sources in accordance with the predetermined priority order. For example, in FIG. 2, the user apparatus UEa simultaneously receives the GPS signal and the SS, and hence, the user apparatus UEa performs synchronization using any one of the GPS signal and the SS (e.g., a GPS signal).

According to the present embodiment, the user apparatus UE is capable of identifying an SLSS synchronized with the GPS signal (hereinafter referred to as "SLSS (GPS sync.)" for convenience), an SLSS synchronized with the SS (hereinafter referred to as "SLSS (NW (Network) sync.) for convenience)," and an SLSS not synchronized with the SS and the GPS signal (hereinafter referred to as "SLSS (No sync.)" for convenience). A specific identification method is described below.

According to the present embodiment, the user apparatus UE that is in direct synchronization with the GPS signal basically does not transmit the SLSS.

When the user apparatus UE synchronized with the GPS or the SS receives a SLSS from a user apparatus UE that is in isolation (not synchronized with the SS and SLSS), the user apparatus UE synchronized with the GPS or the SS may be able to enhance synchronization accuracy of the isolated user apparatus UE by transmitting the SLSS (GPS sync.) or SLSS (NW sync.). For example, in FIG. 2, when the user apparatus UEd synchronized with the GPS signal receives an SLSS from an isolated user apparatus UEe, the user apparatus UEd transmits the SLSS (GPS sync.) toward the user apparatus UEe. As a result, the synchronization accuracy of the user apparatus UEe can be enhanced.

There is a problem that, in V2X, a vehicle as a user apparatus may move at a high speed, so that, for the synchronization based on the D2D signals, time dependent variation of the reception state of the synchronization signals is large, and it is difficult to ensure stability of the synchronization. According to the embodiment, the user apparatus UE is capable of switching multiple synchronization sources at high speed.

The user apparatus UE according to the present embodiment includes a vehicle defined in V2X, a mobile terminal of a driver, and a mobile terminal of a pedestrian. In addition, the RSU defined in V2X may be a user apparatus UE or a base station eNB in the present embodiment unless otherwise specified.

<Process Flow>

The following illustrates specific processes performed by the radio communication system in the present embodiment.

(Synchronization Process)

Figure 5:
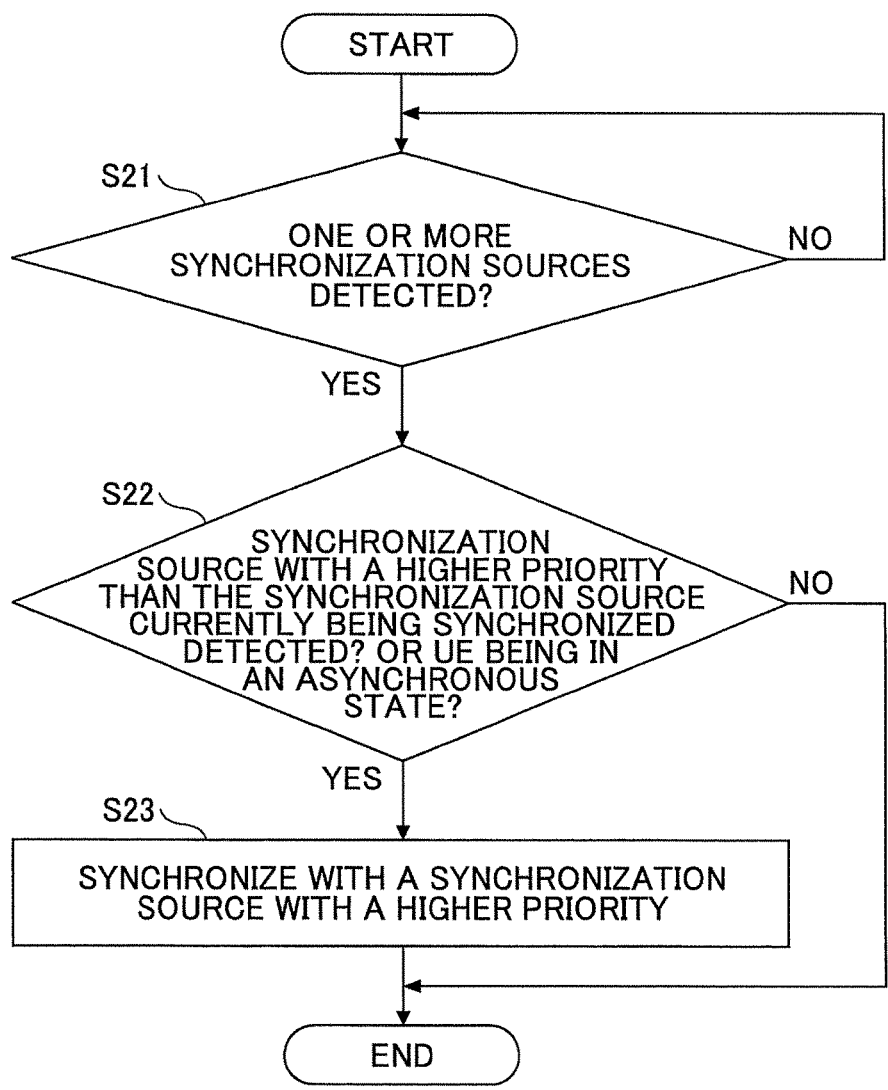
FIG. 5 is a flowchart illustrating an example of a synchronization process according to the embodiment.

FIG. 5 is a flowchart illustrating an example of a synchronization process according to an embodiment. As described above, the user apparatus UE performs synchronization using GPS signals, etc., in addition to SS and SLSS. Upon detecting a plurality of different synchronization sources (SS, GPS signals, SLSS), the user equipment UE performs synchronization using any one of the synchronization sources in accordance with the predetermined priority order. The synchronization process performed by the user apparatus UE is specifically described below with reference to FIG. 5.

In step S21, the user apparatus UE verifies whether one or more synchronization sources are detected. When one or more synchronization sources are detected, the process proceeds to step S22.

In step S22, the user apparatus UE verifies whether the user apparatus UE has detected a synchronization source with a higher priority than the synchronization source that is currently synchronized by the user apparatus UE itself in step S21. When the user apparatus UE has detected a synchronization source with a higher priority than the synchronization source that is currently synchronized by the user apparatus UE itself, the process proceeds to step S23. When the user apparatus UE has not detected a synchronization source with a higher priority than the synchronization source that is currently synchronized by the user apparatus UE itself, the process is terminated. When the user apparatus UE is in an asynchronous state (e.g., immediately after the activation), the process also proceeds to step S23.

Note that the user apparatus UE performs the process of step S22 using priority information indicating the priority degrees of the synchronization sources used for synchronization.

FIG. 6 is a diagram illustrating an example of priority information. In the priority information illustrated in FIG. 6, the priority degrees are defined in the order of a GPS signal, SS, SLSS (GPS sync.), SLSS (NW sync.) and SLSS (No sync.). The priority information may be reported from the base station eNB via an RRC signal, broadcast information (SIB), and a control signal of the layer 1 or layer 2, or the priority information may be reported from the RSU corresponding to the base station eNB. The priority information may be previously configured in a SIM (Subscriber Identity Module) or may be reported via a higher layer control signal transmitted from a core network. The priority itself may be incorporated as a processing logic in a program for operating the user apparatus UE. The priority degrees illustrated in FIG. 6 are merely an example, and the priority degrees may be defined in any other order. For example, the priority degrees may be defined in the order of the SS, GPS signal, SLSS (GPS sync.), SLSS (NW sync.), and SLSS (No sync.) in the priority information.

In step S23, the user apparatus UE performs radio frame synchronization and frequency synchronization using the synchronization source having the highest priority defined in the priority information among one or more synchronization sources detected in step S21.

To perform synchronization with the GPS signal, time intervals may be synchronized, for example, by using highly accurate PPS (Pulse Per Second) output from a GPS reception module of the user apparatus UE. However, in LTE, it is necessary to perform not only synchronization of time intervals but also to perform radio frame synchronization. In order to perform radio frame synchronization, the user apparatus UE needs to detect at least the time (timing) at which the radio frame starts and the radio frame number (SFN (System Frame Number) or DFN) assigned to the radio frame. In the present embodiment, information (hereinafter referred to as "synchronization information") for associating UTC, the time at which the radio frame starts, and the radio frame number (SFN or DFN) is held in the user apparatus UE, and the user apparatus UE performs radio frame synchronization by comparing the UTC obtained from the GPS signal with the synchronization information. The format of the synchronization information is not particularly specified. The "second" corresponding to the timing at which SFN/DFN="0" starts may be configured, or the UTC corresponding to SFN/DFN="0" may be specifically configured. An offset value from the UTC corresponding to SFN/DFN="0" may be included. The synchronization information may be reported from the base station eNB via an RRC signal, broadcast information (SIB), and a control signal of the layer 1 or layer 2, or the synchronization information may be reported from the RSU corresponding to the base station eNB. The synchronization information may be reported via other carriers capable of being used for synchronization without being directly transmitted from the base station eNB, or the synchronization information may be reported together with the cell ID or the like. The synchronization information may be preconfigured in a SIM (Subscriber Identity Module) or may be reported via a higher layer control signal transmitted from a core network.

In the process described above, steps S21 to S23 may be executed for each synchronization source having the same priority, or the user apparatus UE may control the latency in synchronization by monitoring the synchronization sources with lower priority degrees in parallel. Especially, when synchronization is lost after establishing the synchronization, by monitoring the other synchronization sources in the background, full scanning of synchronization sources may become unnecessary in step 1, and smooth switching between synchronization sources can be achieved.

Note that, in the radio communication system according to the embodiment, it is assumed that a synchronization timing of a radio frame in SS matches a synchronization timing of a radio frame determined from a GPS signal and the synchronization information. That is, it is assumed that the base station eNB is also synchronized with the GPS signal.

(SLSS)

In the present embodiment, the user apparatus UE needs to identify SLSS (GPS sync.), SLSS (NW sync.), and SLSS (No sync.). In the present embodiment, these SLSSs may be identified by assigning different sequences to SLSS (GPS sync.), SLSS (NW sync.), and SLSS (No sync.), respectively. For example, different route indices may be used for PSSS in SLSS (GPS sync.), PSSS in SLSS (NW sync.), and PSSS in SLSS (No sync.), respectively. In particular, by assigning a single sequence to SLSS (GPS sync.) and/or SLSS (NW sync.), comparison in received levels between GPS synchronization sources and/or between base station synchronization sources can be omitted. Further, these may be mapped to orthogonal sequences (Cyclic shift and/or Orthogonal sequence) of DM-RSs of channels to be transmitted together with SLSS such as PSBCH, and the corresponding sequences are orthogonalized by not applying group hopping to the corresponding sequences to enhance synchronization accuracy.

Further, new route index may be used only for the PSSS in the SLSS (GPS sync.), while using, for the PSSS in the SLSS (NW sync.) and the PSSS in the SLSS (No. sync.), a route index having the same value as that of the SLSS transmitted within the usual coverage and a route index having the same value as that of the SLSS transmitted outside the coverage, respectively.

In addition, an identifier indicating the type of SLSS may be included in the PSBCH transmitted simultaneously with the SLSS to make the SLSS identifiable. For example, "1" may be set for the identifier of SLSS (GPS sync.), "2" may be set for the identifier of SLSS (NW sync.), and "3" may be set for the identifier of SLSS (No sync.). The identifier may be stored in a reserved area (Reserved bits) of the PSBCH. The areas for configuring a DFN, a TDD UL-DL config, and a Side link system bandwidth included in PSBCH transmitted simultaneously with SLSS are used such that the type of SLSS may be made identifiable by the values configured in these areas. In V2X, it is assumed that all or part of the configuration values specified in these areas and the usual LTE are not used, and hence, it is possible to apply these unused areas and unused configuration values. The configured value of the In-coverage indicator included in the PSBCH transmitted simultaneously with the SLSS may be used for operations of the user apparatuses UE other than the SLSS transmission within the coverage so as to make the type of the SLSS identifiable.

When an identifier indicating the type of SLSS is included in the PBSCH, the sequences of SLSS (GPS sync.), SLSS (NW sync.), and SLSS (No sync.) may be the same or different. Note that an identifier indicating the type of SLSS may be reported from the base station eNB via an RRC signal, broadcast information (SIB), and a control signal of the layer 1 or layer 2, or may be reported from the RSU corresponding to the base station eNB. Alternatively, an identifier indicating the type of SLSS may be preconfigured in a SIM (Subscriber Identity Module) or may be reported via a higher layer control signal transmitted from a core network.

In the following description, "transmitting SLSS (GPS sync.)" indicates transmitting the SLSS such that the SLSS (GPS sync.) can be identified by any one of the methods described above or a combination of any of the methods described above. Similarly, transmitting SLSS (NW sync.) indicates transmitting SLSS such that the SLSS (NW sync.) can be identified, and transmitting SLSS (No sync.) indicates transmitting SLSS such that the SLSS (No sync.) can be identified. That is, transmitting, by the user apparatus UE, a predetermined type of SLSS (SLSS (GPS sync.), etc.) indicates one or both of "transmitting SLSS of the sequence corresponding to the SLSS of the predetermined type" when the type of SLSS is made identifiable only by the SLSS sequence, and "transmitting both SLSS and PSBCH including information corresponding to the type of SLSS" when the type of SLSS is made identifiable by combining SLSS and information stored in PSBCH. Further, "identifying the type of SLSS received by the user equipment UE" is used in one of or both meanings of "identifying the type of SLSS using the sequence of the received SLSS" when the type of SLSS is made identifiable only by the sequence of SLSS, and "receiving both SLSS and PSBCH and identifying the type SLSS using the information included in the received SLSS and PSBCH" when the type of SLSS is made identifiable by combining the SLSS and the information stored in PSBCH.

(SLSS Transmission Trigger)

Next, a transmission trigger is described when the user apparatus UE is to transmit the SLSS. As mentioned above, when the user apparatus UE is in direct synchronization with the GPS signal, the user apparatus UE basically does not transmit the SLSS. Further, when the user apparatus UE receives SLSS (No sync.) in addition to the usual SLSS transmission trigger described in FIG. 4 and is synchronized with the GPS signal or SS, the user apparatus UE transmits the SLSS (GPS sync.) or SLSS (NW sync.).

Figure 7:
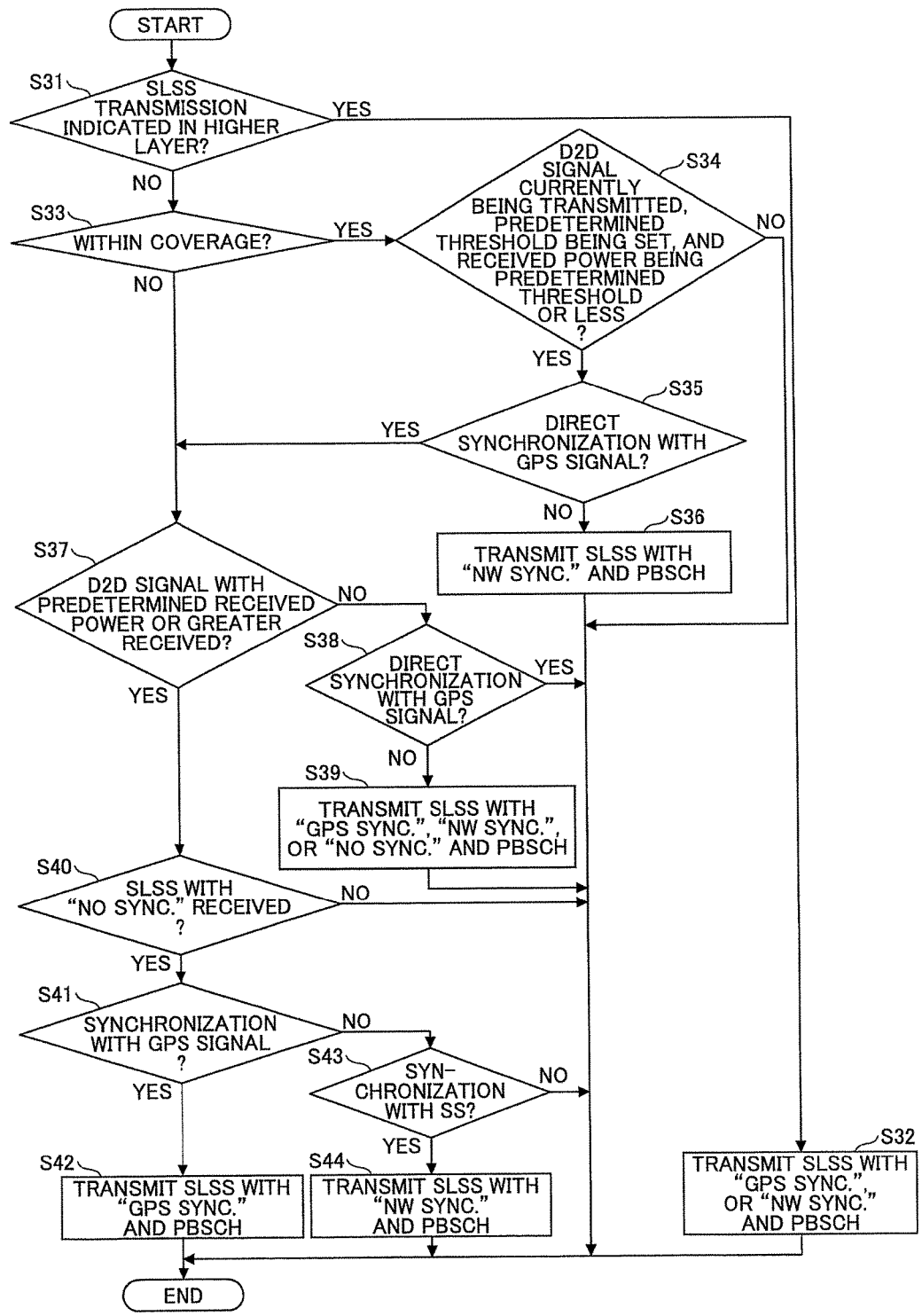
FIG. 7 is a flowchart illustrating an example of an SLSS transmission trigger according to the embodiment.

FIG. 7 is a flowchart illustrating an example of an SLSS transmission trigger according to the embodiment.

Steps S31, S33, and S34 are the same as steps S11, S13, and S14 in FIG. 4, respectively, and the description is thus omitted.

In step S32, the user apparatus UE transmits SLSS (GPS sync.) and PBSCH when the user apparatus UE is synchronized with the GPS signal; and the user apparatus UE transmits SLSS (NW sync.) and PBSCH when the user apparatus UE is synchronized with the SS. Note that "1" indicating "within the coverage" is set for In-coverage indicator.

In step S35, the user apparatus UE verifies whether the user apparatus UE is in direct synchronization with the GPS signal. When the user apparatus UE is in direct synchronization with the GPS signal, the process proceeds to step S37 whereas when the user apparatus UE is not in direct synchronization with the GPS signal, the process proceeds to step S39.

In step S36, the user apparatus UE transmits SLSS (NW sync.) and PBSCH. Note that "1" indicating "within the coverage" is set for In-coverage indicator.

In step S37, when a predetermined threshold (a threshold for determining whether transmission of SLSS is necessary outside the coverage) is configured in a SIB or an RRC signal, the user apparatus UE verifies whether the received power of the D2D signal is greater than or equal to the predetermined threshold. The process proceeds to step S40 when the predetermined threshold is not configured or when the received power is greater than or equal to the predetermined threshold. When the received power is less than the predetermined threshold (including a case where the D2D signal is not detected), the process proceeds to step S38.

In step S38, the user apparatus UE verifies whether the user apparatus UE is in direct synchronization with the GPS signal. When the user apparatus UE is in direct synchronization with the GPS signal, the process is terminated whereas when the user apparatus UE is not in direct synchronization with the GPS signal, the process proceeds to step S39.

In step S39, the user apparatus UE transmits SLSS (GPS sync.) and PBSCH when the user apparatus UE is synchronized with the SLSS (GPS sync.) transmitted by another user apparatus UE; the user apparatus UE transmits SLSS (NW sync.) and PBSCH when the user apparatus UE is synchronized with the SLSS (NW sync.) transmitted by another user apparatus UE; and the user apparatus UE transmits the SLSS (No sync.) and PBSCH when the user apparatus UE is synchronized with SLSS (No sync.) transmitted by another user apparatus UE. The user apparatus UE transmits SLSS (No sync.) and PBSCH when the user apparatus UE is in an isolated state. Note that "0" indicating "outside the coverage" is set for In-coverage indicator.

In step S40, the user apparatus UE verifies whether the user apparatus UE receives the SLSS (No sync.) transmitted by another user apparatus UE. When the user apparatus UE receives the SLSS (No syn.), the process proceeds to step S41, whereas when the user apparatus UE receives SLSS other than SLSS (No sync.), the process is terminated.

In step S41, the user apparatus UE verifies whether the user apparatus UE itself is synchronized with the GPS signal or the SLSS (GPS sync.). When the user apparatus UE itself is synchronized with the GPS signal or the SLSS (GPS sync.), the process proceeds to step S42, whereas when the user apparatus UE itself is not synchronized with the GPS signal or the SLSS (GPS sync.), the process proceeds to step S43.

In step S42, the user apparatus UE transmits SLSS (GPS sync.) and PBSCH.

In step S43, the user apparatus UE verifies whether the user apparatus UE itself is synchronized with SS or SLSS (NW sync.). When the user apparatus UE itself is synchronized with SS or SLSS (NW sync.), the process proceeds to step S44, whereas when the user apparatus UE itself is not synchronized with the SS or SLSS (NW sync.), the process is terminated.

In step S44, the user apparatus UE transmits SLSS (NW sync.) and PBSCH.

The SLSS transmission trigger is described above. According to the present embodiment, the user apparatus UE that is in direct synchronization with the GPS signal does not basically transmit the SLSS. This is because it is expected, in view of the application of V2X, that each of the user apparatuses UE are able to receive GPS signals unless the user apparatuses UE are located within a tunnel, etc. As a result, a processing load on the user equipment UE can be reduced.

In the present embodiment, when the user apparatus UE receives the SLSS (No sync.), and the user apparatus UE itself is synchronized with the GPS signal, SLSS (GPS sync.), SS, or SLSS (NW sync.), the user apparatus UE transmits SLSS (GPS sync.) or SLSS (NW sync.). As a result, the user apparatus UE transmitting the SLSS (No sync.) can synchronized with the SLSS (GPS sync.) or the SLSS (NW sync.), and precision of the synchronization can be enhanced. That is, a highly accurate synchronization state are relayed to each of the user apparatuses UE within the radio communication system.

(Operation Sequence Example)

Next, in accordance with FIG. 6 and the above-described flowchart of FIG. 7, a situation is described in which a synchronization process and transmission (relaying) of synchronization signals are performed in the radio communication system according to the embodiment.

Figure 8:
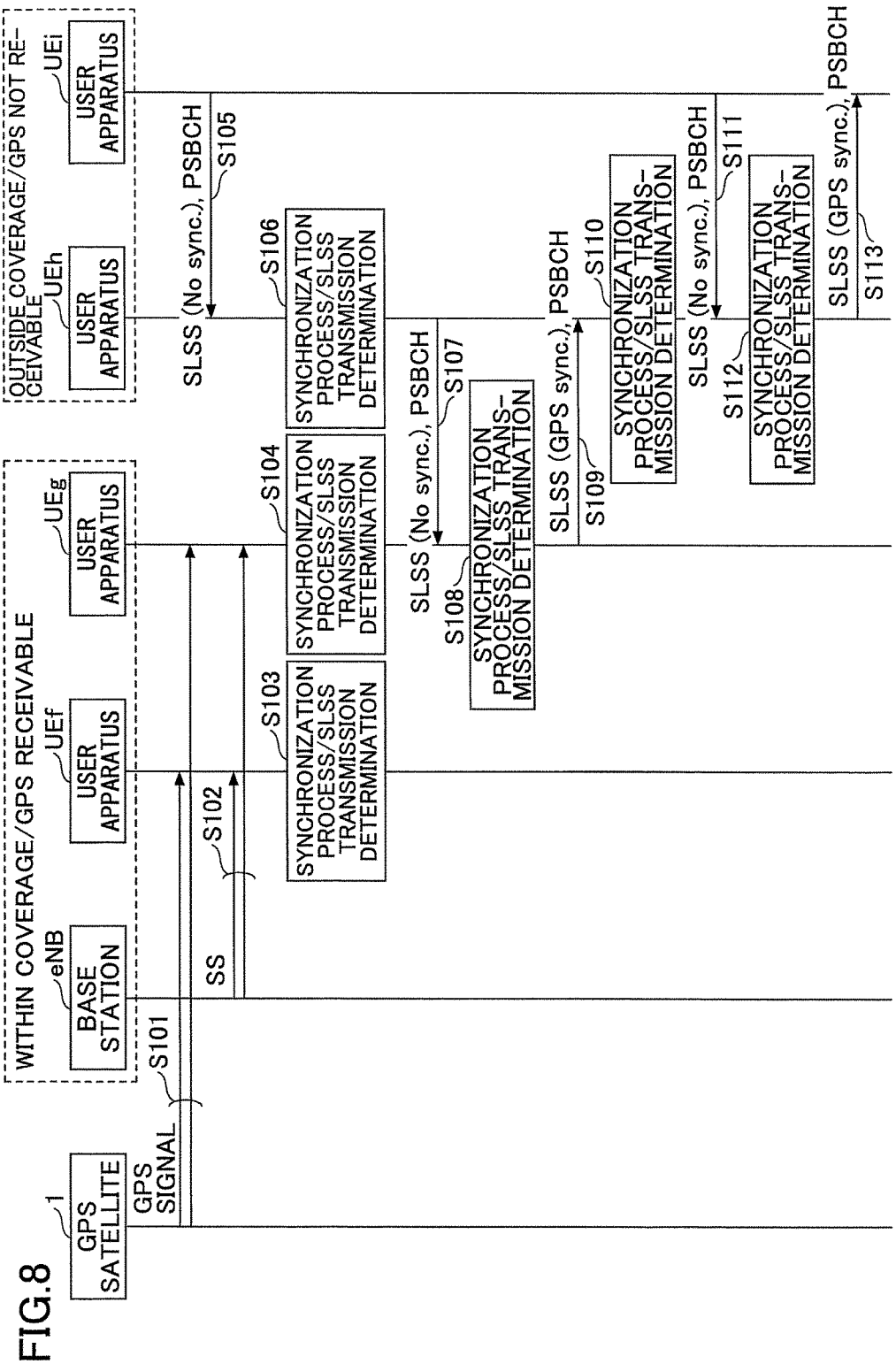
FIG. 8 is a sequence diagram illustrating an operation example of the radio communication system according to the embodiment.

FIG. 8 is a sequence diagram illustrating an operation example of the radio communication system according to the embodiment. In FIG. 8, it is assumed that the user apparatuses UEf and UEg are located within the coverage of the base station eNB and the user apparatuses UEf and UEg are able to receive GPS signals. It is assumed that the user apparatuses UEh and UEi are located outside the coverage of the base station eNB and the user apparatuses UEh and UEi are unable to receive GPS signals. It is also assumed that the priority information defines priority degrees in the order of the GPS signal, the SS, the SLSS (GPS sync.), the SLSS (NW sync.) and the SLSS (No sync.). It is also assumed that the user apparatus UE is not indicated, by a higher layer, to transmit the SLSS in the process of step S31 of FIG. 7.

In step S101, the GPS satellite 1 transmits a GPS signal. In step S102, the base station eNB transmits an SS.

In step S103, the user apparatus UEf that receives the GPS signal and the SS performs a synchronization process using the GPS signal. Note that the user apparatus UEf is in a state in which the user apparatus UEf is directly synchronized with the GPS signal but the user apparatus UEf is in a state in which the user apparatus UEf does not receive a D2D signal transmitted from another user apparatus UE. That is, the process is terminated in accordance with a "No" route of step S37 and a "Yes" route of step S38 in FIG. 7.

In step S104, the user apparatus UEf that receives the GPS signal and the SS performs a synchronization process using the GPS signal. Note that the user apparatus UEg is in a state in which the user apparatus UEg is synchronized with the GPS signal but the user apparatus UEg does not receive a D2D signal transmitted from another user apparatus UE. That is, the process is terminated in accordance with the "No" route of step S37 and the "Yes" route of step S38 in FIG. 7.

In step S105, the user apparatus UEi in an isolated state transmits SLSS (No syn.) and PBSCH according to the process of step S39 in FIG. 7 in order to perform D2D communication with, for example, another user apparatus UE.

In step S106, the user apparatus UEh performs a synchronization process using the SLSS (No sync.) received from the user apparatus UEi. Note that it is assumed that the received power of the SLSS is less than the predetermined threshold indicated by SIB. Accordingly, the user apparatus UE determines that the user apparatus UEh should transmit the SLSS (No sync.) in accordance with the process of step S39 in FIG. 7.

In step S107, the user apparatus UEh transmits SLSS (No sync.) and PBSCH.

In step S108, since the user apparatus UEg has already been synchronized with the GPS signal with a high priority, the user apparatus UEg attempts not be synchronized with the SLSS (No sync.) received in step S107. Further, the user apparatus UEg determines that the user apparatus UEg should transmit the SLSS (GPS sync.) in accordance with the process of step S42 in FIG. 7.

In step S109, the user apparatus UEg transmits SLSS (GPS sync.) and PBSCH.

In step S110, the user apparatus UEh determines that the user apparatus UEh receives SLSS (GPS sync.) with a higher priority than the SLSS (No sync.) with which the user apparatus UEh is currently synchronized, and the user apparatus UEh then performs a synchronization process using SLSS (GPS sync.). Note that it is assumed that the received power of the D2D signal received or measured in advance in step S109 is higher than or equal to a predetermined threshold. Accordingly, the process is terminated in accordance with a "No" route of step S40 in FIG. 7.

Suppose that, in step S111, the user apparatus UEi in an isolated state transmits SLSS (No sync.) and PBSCH according to the process of step S39 in FIG. 7, in order to perform D2D communication with, for example, another user apparatus UE.

In step S112, the user apparatus UEh determines that user apparatus UEh receives SLSS (No sync.) with a lower priority than that of the currently synchronized SLSS (GPS sync.), and hence, the user apparatus UEh does not perform the synchronization process. Further, the user apparatus UEh determines that the user apparatus UEh should transmit the SLSS (GPS sync.) in accordance with the process of step S42 in FIG. 7.

In step S113, the user apparatus UEh transmits the SLSS (GPS sync.) and PBSCH.

The situation is described above in which the synchronization process and the transmission (relaying) of the synchronization signal are performed in the radio communication system according to the embodiment.

(Allocation of Radio Resources Using UTC)

Next, a radio resource allocation method using UTC is described. In the embodiment, a synchronization process is implemented in which the GPS signals are used. In addition to this, the GPS signals may be used for synchronization that is coarse compared to the radio frame synchronization. For example, the user apparatus UE may identify, using UTC obtained by the GPS signal, radio resources with which the D2D communication can be performed.

More specifically, the base station eNB transmits radio resource allocation information indicating "a period during which the RSU is capable of transmitting a D2D signal" and "a period during which the user apparatus UE other than the RSU is capable of transmitting the D2D signal" to the user apparatus UE via broadcast information. Based on the type of the user apparatus UE itself, the radio resource allocation information, and UTC obtained from the GPS signal, the user apparatus UE may transmit the D2D signal in the "period during which the RSU is capable of transmitting the D2D signal" when the type of the user apparatus UE itself is RSU, and the user apparatus UE may transmit the D2D signal in the "period during which the user apparatus UE other than the RSU is capable of transmitting the D2D signal" when the type of the user apparatus UE itself is a user apparatus other than the RSU.

FIG. 9 is a diagram showing an example of a radio resource allocation method using UTC. As illustrated in FIG. 9, a period during which the RSU is capable of transmitting the D2D signal and a period during which the user apparatus UE other than the RSU is capable of transmitting the D2D signal may be alternately configured. TDM may be applied to the transmission resources at the subframe level and/or the frame level, etc., using a terminal time and/or a terminal built-in clock etc., in accordance with the type of a synchronization source (GPS/Base station eNB/Terminal Built-in Clock).

Process Flow (Modified Example)

Subsequently, two or more modified examples of the above-described process are described.

(Modified Examples of SLSS (GPS Sync.))

In the present embodiment, an SLSS (GPS sync.) transmitted by the user apparatus UE that directly receives the GPS signal to perform synchronization may be distinguished from an SLSS (GPS sync.) transmitted by the user apparatus UE that receives an SLSS (GPS sync.) transmitted from another user apparatus UE to perform synchronization. As illustrated in FIG. 10A, an SLSS transmitted from the user apparatus UE that directly receives the GPS signal to perform synchronization may be defined as an SLSS (GPS sync. Level 0), and an SLSS transmitted by the user apparatus UE that receives an SLSS (GPS sync.) to perform synchronization may be defined as an SLSS (GPS sync Level 1).

The number of times each SLSS is relayed may be identifiable. For example, as illustrated in FIG. 10B, the SLSS transmitted by a user apparatus UE that directly receives the GPS signal to perform synchronization is defined as an SLSS (GPS sync. Level 0), the SLSS transmitted by a user apparatus UE that receives the SLSS (GPS sync. Level 0) to perform synchronization is defined as an SLSS (GPS sync. Level 1), and the SLSS transmitted by a user apparatus UE that receives the SLSS (GPS sync. Level 1) to perform synchronization is defined as an SLSS (GPS sync. Level 2). These SLSSs may be identified by applying different sequences to the SLSSs or may be identified by identifiers indicating respective types of the SLSS included in the PSBCHs.

These SLSSs may be included in the priority information. When receiving the SLSS (GPS sync.), the user apparatus UE may perform synchronization using SLSS (GPS sync.) that has been relayed a small number of times.

(Priority of Synchronization Signal Transmitted from RSU)

Figures 11, 12A:
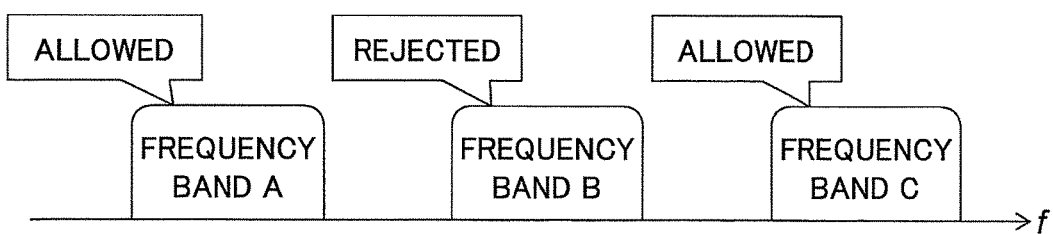
FIG. 11 is a diagram illustrating an example of priority information in which priority of an SLSS to be transmitted from an RSU is defined.
FIG. 12A is a diagram illustrating a synchronization process when a plurality of frequency bands exists.

In the present embodiment, the SLSS transmitted from the RSU may be given higher priority than the priority of the SLSS transmitted from the user apparatus UE other than the RSU. For example, each SLSS transmitted from the RSU may be made distinguishable from each SLSS transmitted from the user apparatus UE other than the RSU, and the priority information may define priority degrees of a GPS signal, an SS signal, each SLSS transmitted from the RSU, and each SLSS transmitted from the user apparatus UE other than the RSU. FIG. 11 illustrates an example of priority information when the priority degree of each SLSS transmitted from the RSU is set higher than the priority degree of each SLSS transmitted from the user apparatus UE other than the RSU.

As described above, each SLSS transmitted from the RSU may be made distinguishable by applying a sequence that is different from the sequence of each SLSS transmitted from the user apparatus UE other than the RSU, or may be made distinguishable by an identifier indicating the type of SLSS included in the PSBCH.

It is assumed that the RSU is mainly installed at a road side, etc., and that the RSU hardly moves. Hence, it is considered that the accuracy of the synchronization signal from the RSU is higher than that of the synchronization signal from the user apparatus UE other than the RSU that is supposed to move. Accordingly, it is possible to enhance the synchronization accuracy in the entire radio communication system by preferentially using the synchronization signal transmitted by the RSU to perform synchronization.

(Allowability of GPS Synchronization for Each of Multiple Frequency Bands)

When two or more frequency bands exist in the radio communication system according to the embodiment, it may be possible to specify whether to allow synchronization using the GPS signal in each of frequency band. For example, as illustrated in FIG. 12A, when frequency bands A to C exist in the radio communication system, synchronization using a GPS signal may be allowed in all the cells of the frequency bands A and C, and the synchronization using the GPS signal may not be allowed in all the cells of frequency band B. Whether to allow the synchronization using the GPS signal in the cells of each frequency band may be reported to the user apparatus UE via broadcast information from each of the base stations eNB forming the cells, or may be preconfigured in a SIM.

Furthermore, whether to allow the GPS synchronization on a cell-by-cell basis in each frequency band may also be reported to the user apparatus UE via the broadcast information. In this case, it is possible to allow (or reject) the GPS synchronization in a specific cell (place). Whether to allow the GPS synchronization may be specified for each country or operator. Specifically, a list of MCC (Mobile Country Code) or MNC (Mobile Network Code) for which the GPS synchronization is allowed may be preconfigured in a SIM. As a result, the user apparatus UE can be prevented from performing the synchronization by using the GPS signal, in a specific area where, for example, the use of the GPS is not allowed.

If there are two or more frequency bands in the radio communication system according to the embodiment and a frequency band used only for V2X (D2D communication) is configured, it may be possible to specify whether to allow synchronization using SS transmitted in a cell in a frequency band other than the frequency band that is used only for the D2D communication.

Figures 12B, 13:
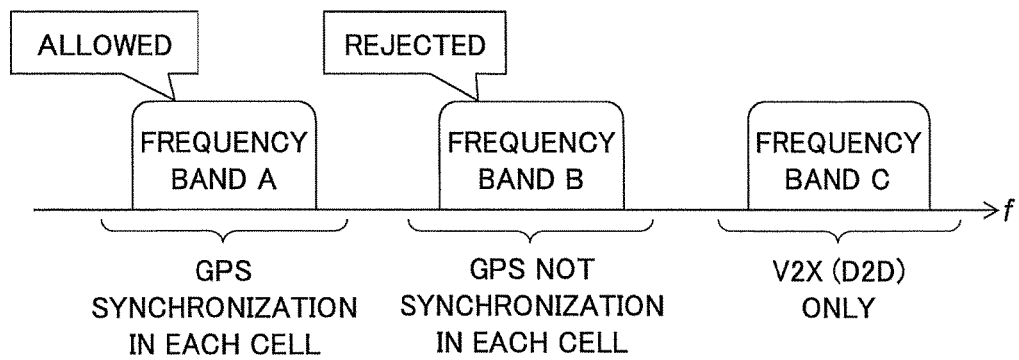
FIG. 12B is a diagram illustrating the synchronization process when a plurality of frequency bands exists.
FIG. 13 is a diagram illustrating an example of the priority information.

As illustrated in FIG. 12B, it is assumed, for example, that there are frequency bands A to C, the SS transmitted in each cell in the frequency band A is synchronized with the GPS signal, the SS transmitted in each cell in the frequency band B is not synchronized with the GPS signal. Further, it is assumed that the frequency band C is a frequency band used only for the V2X (D2D) communication, and that SS is not transmitted in the frequency band C. Note that the SS being synchronized with the GPS signal indicates that the synchronization timing of the radio frame in the SS matches the synchronization timing of the radio frame determined based on the GPS signal and the synchronization information.

In such a case, if the user apparatus UE that attempts to perform a D2D communication in the frequency band C is located at a place where the user apparatus UE is not capable of receiving the GPS signal and synchronization is performed using the SS transmitted in each cell in the frequency band B, the synchronization is to be performed at a synchronization timing different from that of the synchronization established at a place where the GPS signal is receivable, which is not preferable. Accordingly, a frequency band in which it is allowed to perform synchronization using SS and a frequency band in which it is not allowed to perform synchronization using SS may be reported to the user apparatus UE via the broadcast information from the base station eNB.

As a result, when a cell is established in which only the V2X communication is allowed, a likelihood can be eliminated such that an SS of the cell that is operated in a state in which the SS is not synchronized with the GPS signal is erroneously used for synchronization.

(Differentiation Between Synchronization Using GPS Signal and Synchronization Using SS)

In the present embodiment, SLSS (GPS sync.) is made distinguishable from SLSS (NW sync.); however, SLSS (GPS sync.) and SLSS (NW sync.) may be made common. As a result, the synchronization process can be simplified. Note that "to make common" includes one of or both of operating, by the user apparatus UE, to transmit the identical types of SLSSs irrespective of the type of the synchronization source with which the user apparatus UE itself is synchronized (i.e., commonality in terms of transmission), and operating, by the user apparatus UE that receives SLSSs, to recognize that the SLSSs have the identical priority degrees (i.e., commonality in terms of reception).

(Type of User Apparatus that Transmits SLSS)

In the present embodiment, transmission of the SLSS may be allowed only to the user apparatus UE of a specific type. For example, the base station eNB includes, in the broadcast information, transmission permission information that associates the type of the user apparatus UE with information indicating whether transmission of the SLSS is allowed and transmits the broadcast information; and the user apparatus UE compares the type of the user apparatus UE itself and the transmission permission information, and, upon determining that transmission of the SLSS is permitted, the user apparatus UE may transmit the SLSS. As an example, the base station eNB may transmit, only to the RSU, transmission permission information that allows transmission of SLSS.

It is assumed that the RSU is mainly installed at a road side, etc., and that the RSU hardly moves. Hence, it is considered that the accuracy of the SLSS from the RSU is higher than that of the SLSS from the user apparatus UE other than the RSU that is supposed to move. The synchronization accuracy may be increased in the whole radio communication system by allowing only the RSU to transmit the SLSS.

(Radio Frame Synchronization and Frequency Synchronization)

In the present embodiment, the user apparatus UE may apply different priority degrees to a synchronization signal used for radio frame synchronization (GPS signal, SS, and each of SLSSs) and to a synchronization signal used for frequency synchronization (GPS signal, SS, and each of SLSSs). For example, the user apparatus UE may obtain priority information on a synchronization signal used for radio frame synchronization and priority information on a synchronization signal used for frequency synchronization; and, upon receiving a synchronization signal, the user apparatus UE may perform synchronization process in accordance with the priority information corresponding to the received synchronization signal. Further, it may be reported whether the V2X carrier specified by broadcast by the base station eNB is allowed to be used for time synchronization/ allowed to be used for frequency synchronization. It may be indirectly reported whether it is allowed to be used for the time synchronization by reporting whether the time synchronization uses a GPS signal, and/or by reporting a time offset with respect to GSP. As a result, for example, an operation can be performed in which the GPS signal is used only for the radio frame synchronization.

(Stability of Synchronization)

When the user apparatus UE moves to an area in which the user apparatus UE is not able to receive a signal from the external synchronization source (e.g., a GPS signal), or outside the coverage, a predetermined time or more may be required until synchronization using another synchronization source is performed, which may fail synchronization stability.

Hence, the user apparatus UE may be able to maintain synchronization by self-running until synchronization using another synchronization source is established. When a time during which the user apparatus UE is able to maintain synchronization by the self-running state is set in advance, and the user apparatus UE fails to establish synchronization using another synchronization source after the time elapses, the D2D communication may be stopped or the synchronization source may be changed to the user apparatus UE itself. The above-described time may be set in accordance with the clock performance of the user apparatus UE, or the user apparatus UE may be provided with a clock that satisfies the above-described time.

Further, the user apparatus UE may perform a synchronization process using a synchronization source (SLSS) having a lower priority than that of the synchronization source that was used for the synchronization immediately before. The user apparatus UE may continue monitoring SLSS, so that the SLSS can be received at any time. The monitoring of the SLSS may be performed when the user apparatus UE itself does not transmit the SLSS. Further, the carrier on which the user apparatus UE monitors the SLSS may be the same carrier as the carrier used by the user apparatus UE for the D2D communication, or may be a carrier associated with the carrier used for the D2D communication. The user apparatus UE may transmit the SLSS at a head subframe of a resource pool so as to reduce reception errors that may occur when the receiving side user apparatus UEb monitors the SLSS. By providing, within a resource pool, a gap interval used for monitoring a synchronization source for another carrier, the user apparatus UE may be facilitated to monitor the synchronization source for the other carrier.

The user apparatus UE may shorten the transmission cycle of the SLSS. In usual D2D, the transmission cycle of the SLSS is 40 ms; however, the transmission cycle of the SLSS may be set to, for example, 10 ms. The transmission cycle may be shortened only for the SLSS transmitted by the RSU. In the transmission cycle of the SLSS, a cycle may be defined in which only the SLSS is transmitted without transmitting the PBSCH. In a subframe in which only the SLSS is transmitted without transmitting the PSBCH, SCI and the data may be punctured to make the SLSS to be transmittable. Further, the transmission subframe of SLSS with high priority such as SLSS for a GPS source may be configured by subframe offset, etc., or the transmission cycle may be shortened.

The user apparatus UE may always transmit the SLSS periodically. For example, the user apparatus UE synchronized with the GPS may always transmit the SLSS; the base station eNB may indicate, via the RRC signal, broadcast information (SIB), or a control signal of a layer 1 or layer 2, to the user apparatus UE whether the user apparatus UE always transmits the SLSS periodically; or the indication may be made by an RSU corresponding to the base station eNB. Alternatively, the indication may be preconfigured in a SIM, or the indication may be made through a higher layer control signal transmitted from a core network. Further, even within the coverage, the user apparatus UE may operate in the same manner as the user apparatus UE operates outside the coverage (however, some radio parameters may be configured by the base station eNB and the synchronization signal of the base station eNB may be used as the synchronization source). Alternatively, the user apparatus UE may be caused to always transmit the SLSS without measurement by not using, as a SLSS transmission condition outside the coverage, the threshold of the received level of the D2D signal (e.g., by defining a threshold of minus infinity).

The synchronization accuracy may be enhanced by increasing (boosting) the transmission power of SLSS and/or PSBCH with respect to other channels/signals.

(Priority Determination Indicated by Base Station and Reflection Method to User Apparatus Outside Coverage)

Currently, it has been proposed, in 3GPP, that a base station eNB is to be allowed to indicate, to a user apparatus UE within the coverage, a priority degree as to whether to preferentially use the GPS as a synchronization source or preferentially use the SS as a synchronization source. When the user apparatus UE is indicated to preferentially use the GPS as the synchronization source, the user apparatus UE basically utilizes GPS as the synchronization source, whereas when the user apparatus UE is indicated to preferentially use the SS as the synchronization source, the user apparatus UE basically operates to use SS as a synchronization source. According to the operation examples described above, the user apparatus UE using the GPS as the synchronization source transmits the SLSS (GPS sync.) and the user apparatus UE using the SS as the synchronization source transmits the SLSS (NW sync.) to the outside of the coverage.

Here, it may be preferable to reflect the above-described indication of the priority degree by the base station eNB also on the user apparatus UE outside the coverage. Specifically, when the user apparatus UE outside the GPS signal area and outside the coverage receives both the SLSS (GPS sync.) and the SLSS (NW sync.), it is preferable that the user apparatus UE synchronize with the SLSS corresponding to the synchronization source indicated by the base station eNB within the coverage. However, since the user apparatus UE outside the coverage is incapable of directly receiving the priority degree indicated by the base station eNB, the user apparatus UE outside the coverage is unable to determine which SLSS the user apparatus UE is to be synchronized with.

In the process described above, when the user apparatus UE receives two or more SLSSs outside the coverage, the user apparatus UE selects which SLSS the user apparatus UE is to be synchronized with, based on the priority information. Namely, it can be considered that, by reflecting the indication of the priority degree from the base station eNB in the priority information, the problem described above can be solved by using the above-described process as it is. However, when the indication of the priority degree from the base station eNB is changed, there may be a mismatch with the priority information. Accordingly, the indication of the priority degree from the base station eNB may not be appropriately reflected to the user apparatus UE outside the coverage.

In order to appropriately reflect the priority indicated by the base station eNB to the user apparatus UE outside the coverage, the radio communication system may use the following process.

[Outline]

In this process, the priority (priority order) for each type of SLSS may be defined in advance, and the user apparatus UE within the coverage transmits the type of the SLSS with the priority corresponding to the priority indicated by the base station eNB, based on the priority indicated by the base station eNB and the synchronization source with which the user apparatus UE is synchronized. When the priority indicated by the base station eNB is changed, the user apparatus UE within the coverage switches so as to transmit a type of the SLSS with priority corresponding to the indication from the base station eNB. Upon receiving two or more SLSSs outside the coverage, the user apparatus UE determines which SLSS the user apparatus UE is to be synchronized with in accordance with predetermined priority degrees among SLSS types. As a result, the indication of the priority degree from the base station eNB is reflected to the user apparatus UE outside the coverage, and the user apparatus UE outside the coverage is able to appropriately determine the SLSS with which the user apparatus UE is to be synchronized.

[Type of SLSS]

In this process, since two or more types of SLSSs are used, the user apparatus UE may need to identify two or more types of SLSS. In this process, the type of SLSS may be made identifiable by assigning different sequence to two or more types of SLSS, respectively.

In addition, an identifier indicating the type of SLSS may be included in the PSBCH transmitted simultaneously with the SLSS to make the SLSS identifiable. The identifier may be stored in a reserved area (Reserved bits) of the PSBCH. The areas for configuring a DFN, a TDDUL-DL config, and a Side link system bandwidth included in PSBCH transmitted simultaneously with SLSS may ne used, so that the type of SLSS may be made identifiable by the values configured in these areas. In V2X, it is assumed that all or part of the configured values defined in these areas and the usual LTE are not used, and hence, it is possible to apply these unused areas and unused configured values.

The configured value of the In-coverage indicator included in the PSBCH transmitted simultaneously with the SLSS may be used so as to make the type of the SLSS identifiable. Further, a new physical channel differing from the PSBCH transmitted simultaneously with the SLSS may be defined, and the identifier may be stored in the new physical channel.

The type of SLSS may be made identifiable by associating the sequence of DM-RS transmitted with the SLSS, such as PSBCH, with the type of SLSS.

There is no limitation to the number of types that may be defined as the type of SLSS in this process. In the description of the process, it is assumed that the user apparatus UE is capable of identifying the type of the SLSS by any one of the methods described above or a combination of the methods described above. That is, in the description of the process, as described above, to transmit a predetermined type of SLSS by the user apparatus UE is used in meaning to imply one of or both of "to transmit an SLSS with a sequence corresponding to the predetermined type of the SLSS" and "to transmit both the SLSS and the PSBCH including information corresponding to the type of the SLSS." Further, to identify the type of SLSS received by the user apparatus UE is used in meaning to imply one of or both of "to identify the type of the SLSS using the sequence of the received SLSS" and "to receive both the SLSS and the PSBCH and to identify the type of the SLSS using information included in the received SLSS and in the received PSBCH."

[Priority Information]

In the priority information used in this process, the type of SLSS is stored in association with the priority (priority order). For example, FIG. 13 illustrates an example of the priority information when there are five types of SLSS (SLSS_A to E). In the example of FIG. 13, the priority of SLSS_A is the highest, and the priority of SLSS_E is the lowest. Upon receiving two or more types of SLSS outside the coverage, the user apparatus UE operates to determine the priority of each of the received SLSSs using the priority information and to establish synchronization with the SLSS with the highest priority.

The priority information may be combined with the priority information illustrated in FIG. 6 or FIG. 11. For example, of the priority information illustrated in FIG. 6 or FIG. 11, the part related to SLSS may be replaced with the type of SLSS as illustrated in FIG. 13. Further, priority information differing from the priority information illustrated in FIG. 6 or FIG. 11 may be configured in the user apparatus UE as separate information, or the priority itself as illustrated in FIG. 13 may be incorporated in a program for operating the user apparatus UE as a process logic.

[Association Between Synchronization Source and Priority of Each SLSS, and Operation Example]

The following describes, with reference to the accompanying drawings, a specific example of association between the synchronization source and the priority of each SLSS, and an operation example. Note that, as for the operation, by the receiving side user apparatus UE, to select the SLSS to be synchronized with may be described while omitting a part of the description depending on necessity.

In FIGS. 14A to 14C, 15A to 15D, 16A to 16D, 17A to 17E, and 18, "priority 1" to "priority 5" indicate the priority degrees of the respective synchronization sources, and indicate that each synchronization source is associated with a type of an SLSS corresponding to a priority degree defined in the priority information. For example, "priority 1" indicates the synchronization source with the highest priority, and is associated with an SLSS with the priority 1 (SLSS_A in the example of FIG. 13).

"eNB (InC)" indicates a case where SS transmitted from the base station eNB within the coverage (In Coverage) is used as a synchronization source. "GPS" indicates a case where a GPS signal is used as a synchronization source. "Isolated source" indicates a case where a clock inside the user apparatus UE is used as a synchronization source.

With respect to each of the synchronization sources not illustrated in FIGS. 14A to 14C, 15A to 15D, 16A to 16D, 17A to 17E, and 18, it implies that the user apparatus UE synchronized with the not-illustrated synchronization source does not transmit the SLSS.

Figure 14A:
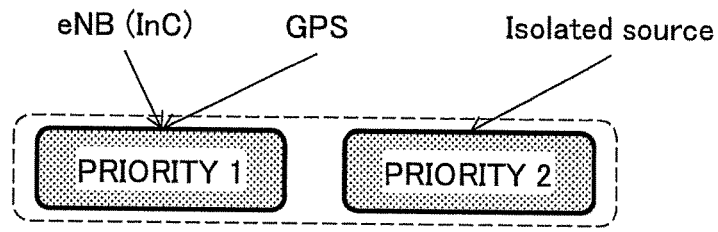
FIG. 14A is a diagram illustrating an example of a correspondence relationship between a synchronization source and an SLSS.

In the example of FIG. 14A, "eNB (InC)" and "GPS" are "priority 1" and are associated with the type of SLSS of "priority 1", and "isolated source" is "priority 2" and is associated with the type of SLSS of "priority 2".

In the example of FIG. 14A, when the user apparatus UE synchronized with the SS or GPS signal transmitted from the base station eNB within the coverage (In coverage) transmits the SLSS, the user apparatus UE transmits an SLSS of the type corresponding to "priority 1". When the user apparatus UE synchronized with the clock inside the user apparatus UE transmits an SLSS, the user apparatus UE transmits an SLSS of the type corresponding to "priority 2". The user apparatus UE that has received both the SLSS of "priority 1" and the SLSS of "priority 2" outside the coverage performs synchronization with the SLSS corresponding to "priority 1".

Figure 14B:
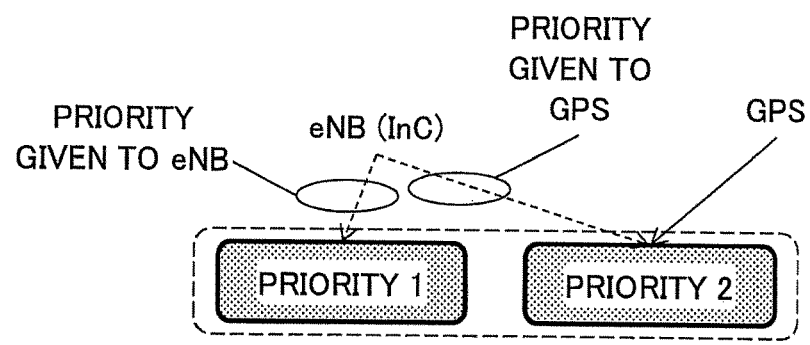
FIG. 14B is a diagram illustrating an example of the correspondence relationship between the synchronization source and the SLSS.

In the example of FIG. 14B, when the base station eNB indicates that the SS is to be preferentially used as a synchronization source within the coverage, the "eNB (InC)" is "priority 1" and is associated with the type of SLSS of "priority 1". When the base station eNB indicates that the GPS is to be preferentially used as the synchronization source within the coverage, the "eNB (InC)" is "priority 2" and is associated with the type of SLSS of "priority 2". Further, "GPS" is "priority 2" and is associated with the type of SLSS of "priority 2".

In the example of FIG. 14B, when the user apparatus UE synchronized with the SS transmitted from the base station eNB within the coverage transmits an SLSS, the user apparatus UE transmits an SLSS of the type corresponding to "priority 1" or "priority 2" in accordance with the indication of the base station eNB. When the user apparatus UE synchronized with GPS transmits an SLSS, the user apparatus UE transmits an SLSS of the type corresponding to "priority 2". In the example of FIG. 14B, unlike FIG. 14A, the "isolated source" is not described in the synchronization source. That is, in the example of FIG. 14B, the user apparatus UE synchronized with "isolated source" does not transmit SLSS.

Figure 14C:
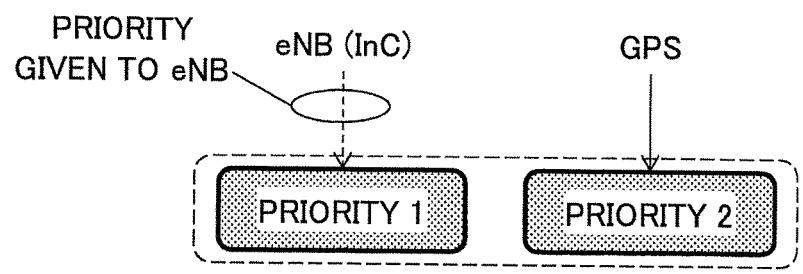
FIG. 14C is a diagram illustrating an example of the correspondence relationship between the synchronization source and the SLSS.

In the example of FIG. 14C, when the base station eNB indicates that the SS is to be preferentially used as a synchronization source within the coverage, the "eNB (InC)" is "priority 1" and is associated with the type of SLSS of "priority 1". Further, "GPS" is "priority 2" and is associated with the type of SLSS of "priority 2".

In the example of FIG. 14C, when the base station eNB indicates that the SS is to be preferentially used as a synchronization source within the coverage, the user apparatus UE synchronized with the SS transmitted from the base station eNB within coverage (In coverage) transmits an SLSS of the type corresponding to "priority 1". When the user apparatus UE synchronized with the GPS transmits an SLSS, the user apparatus UE transmits an SLSS of the type corresponding to "priority 2". In the example of FIG. 14C, unlike the example of FIG. 14B, a description is not given of a case where the base station eNB indicates that the GPS is to be preferentially used as the synchronization source within the coverage. That is, in the example of FIG. 14C, when the base station eNB indicates that the GPS is to be preferentially used as the synchronization source within the coverage, the user apparatus UE synchronized with the SS does not transmit SLSS.

Figure 15A:
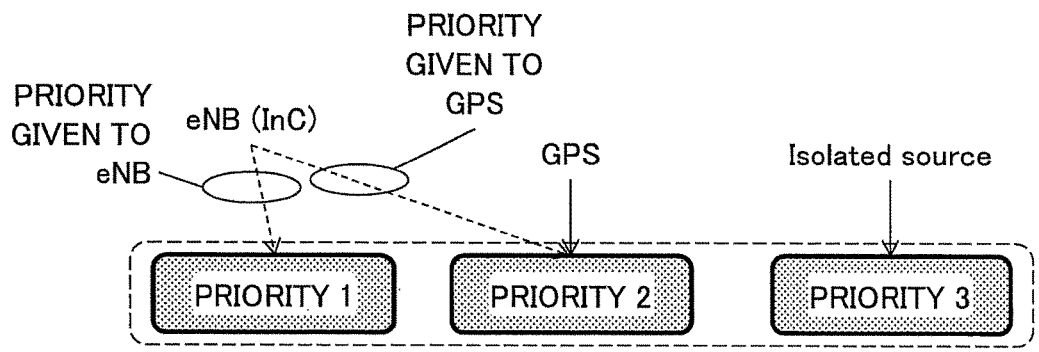
FIG. 15A is a diagram illustrating an example of the correspondence relationship between the synchronization source and the SLSS.

In the example of FIG. 15A, when the base station eNB indicates that the SS is to be preferentially used as a synchronization source within the coverage, the "eNB (InC)" is "priority 1" and is associated with the type of SLSS of "priority 1". When the base station eNB indicates that the GPS is to be preferentially used as the synchronization source within the coverage, the "eNB (InC)" is "priority 2" and is associated with the type of SLSS of "priority 2". Further, the "GPS" is "priority 2" and is associated with the type of SLSS of "priority 2". Moreover, the "isolated source" is "priority 3" and is associated with the type of SLSS of "priority 3".

In the example of FIG. 15A, when the user apparatus UE synchronized with the SS transmitted from the base station eNB within the coverage transmits an SLSS, the user apparatus UE transmits an SLSS of the type corresponding to "priority 1" or "priority 2" in accordance with the indication of the base station eNB. When the user apparatus UE synchronized with GPS transmits an SLSS, the user apparatus UE transmits an SLSS of the type corresponding to "priority 2". When the user apparatus UE synchronized with the clock inside the user apparatus UE transmits an SLSS, the user apparatus UE transmits an SLSS of the type corresponding to "priority 3". The user apparatus UE that has received two or more SLSSs outside the coverage among the SLSSs of "priority 1", "priority 2" and "priority 3" synchronizes with the SLSS with the highest priority.

Figure 15B:
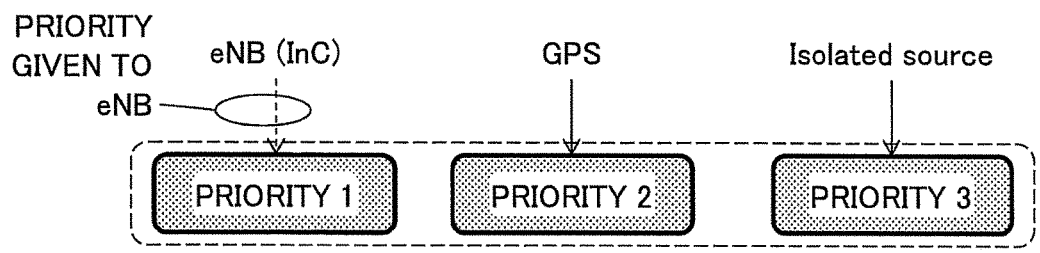
FIG. 15B is a diagram illustrating an example of the correspondence relationship between the synchronization source and the SLSS.

In the example of FIG. 15B, when the base station eNB indicates that the SS is to be preferentially used as a synchronization source within the coverage, the "eNB (InC)" is "priority 1" and is associated with the type of SLSS of "priority 1". Further, the "GPS" is "priority 2" and is associated with the type of SLSS of "priority 2". Moreover, the "isolated source" is "priority 3" and is associated with the type of SLSS of "priority 3".

In the example of FIG. 15B, when the base station eNB indicates that the SS is to be preferentially used as a synchronization source within the coverage, the user apparatus UE synchronized with the SS transmitted from the base station eNB within coverage transmits an SLSS of the type corresponding to "priority 1". When the user apparatus UE synchronized with the GPS transmits an SLSS, the user apparatus UE transmits an SLSS of the type corresponding to "priority 2". When the user apparatus UE synchronized with the clock inside the user apparatus UE transmits an SLSS, the user apparatus UE transmits an SLSS of the type corresponding to "priority 3".

Figure 15C:
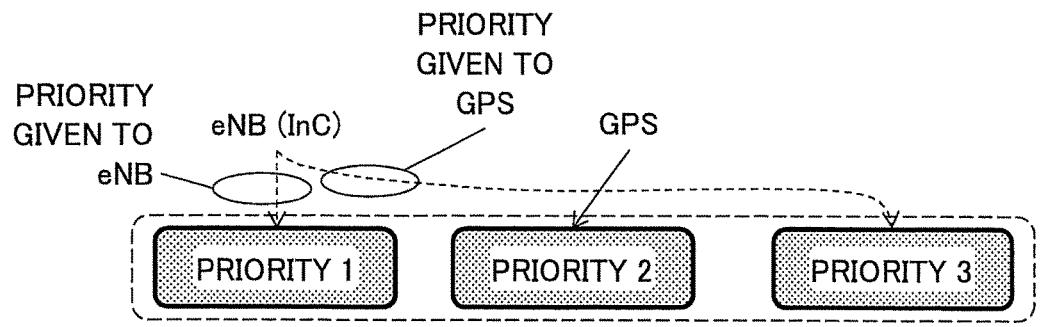
FIG. 15C is a diagram illustrating an example of the correspondence relationship between the synchronization source and the SLSS.

In the example of FIG. 15C, when the base station eNB indicates that the SS is to be preferentially used as a synchronization source within the coverage, the "eNB (InC)" is "priority 1" and is associated with the type of SLSS of "priority 1". When the base station eNB indicates that the GPS is to be preferentially used as the synchronization source within the coverage, the "eNB (InC)" is "priority 3" and is associated with the type of SLSS of "priority 3". Further, the "GPS" is "priority 2" and is associated with the type of SLSS of "priority 2".

In the example of FIG. 15C, when the user apparatus UE synchronized with the SS transmitted from the base station eNB within the coverage transmits an SLSS, the user apparatus UE transmits an SLSS of the type corresponding to "priority 1" or "priority 3" in accordance with the indication of the base station eNB. When the user apparatus UE synchronized with the GPS transmits an SLSS, the user apparatus UE transmits an SLSS of the type corresponding to "priority 2".

In the example of FIG. 15D, when the base station eNB indicates that the SS is to be preferentially used as a synchronization source within the coverage, the "eNB (InC)" is "priority 1" and is associated with the type of SLSS of "priority 1". When the base station eNB indicates that the GPS is to be preferentially used as the synchronization source within the coverage, the "eNB (InC)" is "priority 3" and is associated with the type of SLSS of "priority 3". Further, the "GPS" is "priority 2" and is associated with the type of SLSS of "priority 2". Moreover, the "isolated source" is "priority 4" and is associated with the type of SLSS of "priority 4".

In the example of FIG. 15D, when the user apparatus UE synchronized with the SS transmitted from the base station eNB within the coverage transmits an SLSS, the user apparatus UE transmits an SLSS of the type corresponding to "priority 1" or "priority 3" in accordance with the indication of the base station eNB. When the user apparatus UE synchronized with the GPS transmits an SLSS, the user apparatus UE transmits an SLSS of the type corresponding to "priority 2". When the user apparatus UE synchronized with the clock inside the user apparatus UE transmits an SLSS, the user apparatus UE transmits an SLSS of the type corresponding to "priority 4". The user apparatus UE that has received two or more SLSSs outside the coverage among the SLSSs of "priority 1", "priority 2" and "priority 3" synchronizes with the SLSS with the highest priority.

Various associations between the synchronization sources and the types of the SLSSs are described above with reference to FIGS. 14A to 14C and FIGS. 15A to 15D. In the examples of FIGS. 14A to 14C and 15A to 15D, the cases where the synchronization source is other than the SLSS are described; however, the SLSS may be included in the synchronization source as illustrated in the following example.

In the following description, "eNB (OoC)" indicates a case where an SLSS transmitted from the user apparatus UE using the SS as the synchronization source within the coverage is used as a synchronization source.

Figure 16A:
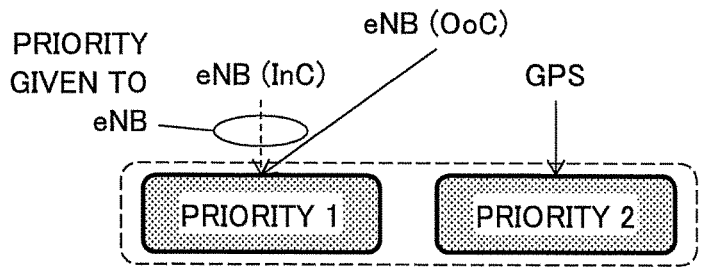
FIG. 16A is a diagram illustrating an example of the correspondence relationship between the synchronization source and the SLSS.

In the example of FIG. 16A, when the base station eNB indicates that the SS is to be preferentially used as a synchronization source within the coverage, the "eNB (InC)" is "priority 1" and is associated with the type of SLSS of "priority 1". Likewise, the "eNB (OoC)" is "priority 1" and is associated with the type of SLSS of "priority 1". Further, the "GPS" is "priority 2" and is associated with the type of SLSS of "priority 2".

In the example of FIG. 16A, when the base station eNB indicates that the SS is to be preferentially used as a synchronization source within the coverage, the user apparatus UE synchronized with the SS transmitted from the base station eNB within coverage transmits an SLSS of the type corresponding to "priority 1". The user apparatus UE synchronized with the SLSS (the same as the SLSS of "priority 1" in the example of FIG. 16A) transmitted from the user apparatus UE that uses the SS as the synchronization source within the coverage transmits an SLSS of the type corresponding to "priority 1". When the user apparatus UE synchronized with the GPS transmits an SLSS, the user apparatus UE transmits an SLSS of the type corresponding to "priority 2".

Figure 16B:
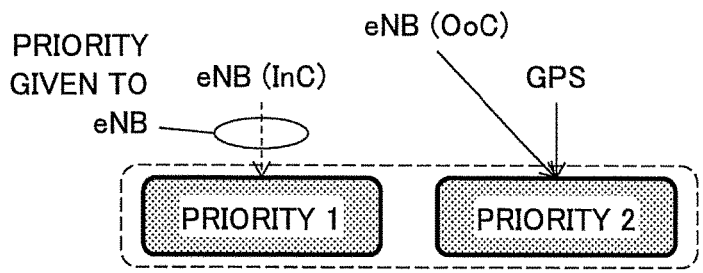
FIG. 16B is a diagram illustrating an example of the correspondence relationship between the synchronization source and the SLSS.

In the example of FIG. 16B, when the base station eNB indicates that the SS is to be preferentially used as a synchronization source within the coverage, the "eNB (InC)" is "priority 1" and is associated with the type of SLSS of "priority 1". Likewise, the "eNB (OoC)" is "priority 2" and is associated with the type of SLSS of "priority 2". Further, the "GPS" is "priority 2" and is associated with the type of SLSS of "priority 2".

In the example of FIG. 16B, when the base station eNB indicates that the SS is to be preferentially used as a synchronization source within the coverage, the user apparatus UE synchronized with the SS transmitted from the base station eNB within coverage transmits an SLSS of the type corresponding to "priority 1". The user apparatus UE synchronized with the SLSS (the same as the SLSS of "priority 1" in the example of FIG. 16B) transmitted from the user apparatus UE that uses the SS as the synchronization source within the coverage transmits an SLSS of the type corresponding to "priority 2". When the user apparatus UE synchronized with the GPS transmits an SLSS, the user apparatus UE transmits an SLSS of the type corresponding to "priority 2".

Figure 16C:
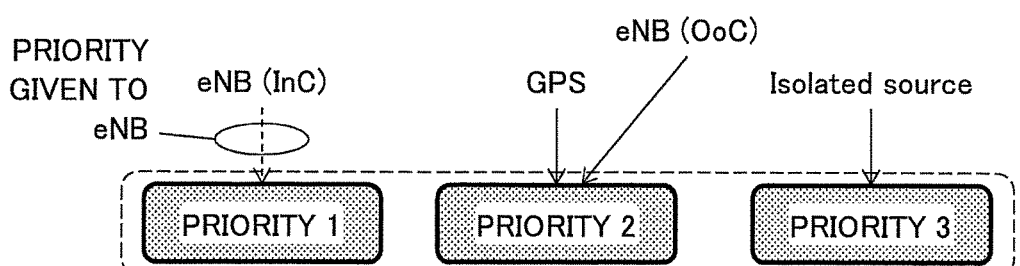
FIG. 16C is a diagram illustrating an example of the correspondence relationship between the synchronization source and the SLSS.

In the example of FIG. 16C, when the base station eNB indicates that the SS is to be preferentially used as a synchronization source within the coverage, the "eNB (InC)" is "priority 1" and is associated with the type of SLSS of "priority 1". Likewise, the "eNB (OoC)" is "priority 2" and is associated with the type of SLSS of "priority 2". Further, the "GPS" is "priority 2" and is associated with the type of SLSS of "priority 2". Moreover, the "isolated source" is "priority 3" and is associated with the type of SLSS of "priority 3".

In the example of FIG. 16C, when the base station eNB indicates that the SS is to be preferentially used as a synchronization source within the coverage, the user apparatus UE synchronized with the SS transmitted from the base station eNB within coverage transmits an SLSS of the type corresponding to "priority 1". The user apparatus UE synchronized with the SLSS (the same as the SLSS of "priority 1" in the example of FIG. 16C) transmitted from the user apparatus UE that uses the SS as the synchronization source within the coverage transmits an SLSS of the type corresponding to "priority 2". When the user apparatus UE synchronized with the GPS transmits an SLSS, the user apparatus UE transmits an SLSS of the type corresponding to "priority 2". When the user apparatus UE synchronized with the clock inside the user apparatus UE transmits an SLSS, the user apparatus UE transmits an SLSS of the type corresponding to "priority 3".

Figure 16D:
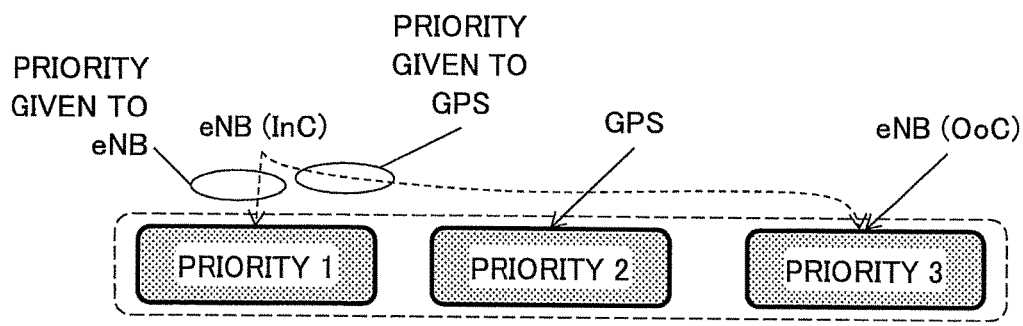
FIG. 16D is a diagram illustrating an example of the correspondence relationship between the synchronization source and the SLSS.

In the example of FIG. 16D, when the base station eNB indicates that the SS is to be preferentially used as a synchronization source within the coverage, the "eNB (InC)" is "priority 1" and is associated with the type of SLSS of "priority 1". When the base station eNB indicates that the GPS is to be preferentially used as the synchronization source within the coverage, the "eNB (InC)" is "priority 3" and is associated with the type of SLSS of "priority 3". Further, the "GPS" is "priority 2" and is associated with the type of SLSS of "priority 2". Likewise, the "eNB (OoC)" is "priority 3" and is associated with the type of SLSS of "priority 3".

In the example of FIG. 16D, when the base station eNB indicates that the SS is to be preferentially used as a synchronization source within the coverage, the user apparatus UE synchronized with the SS transmitted from the base station eNB within coverage transmits an SLSS of the type corresponding to "priority 1". The user apparatus UE synchronized with the SLSS (the same as the SLSS of "priority 1" in the example of FIG. 16D) transmitted from the user apparatus UE that uses the SS as the synchronization source within the coverage transmits an SLSS of the type corresponding to "priority 3". When the user apparatus UE synchronized with the GPS transmits an SLSS, the user apparatus UE transmits an SLSS of the type corresponding to "priority 2".

Figure 17A:
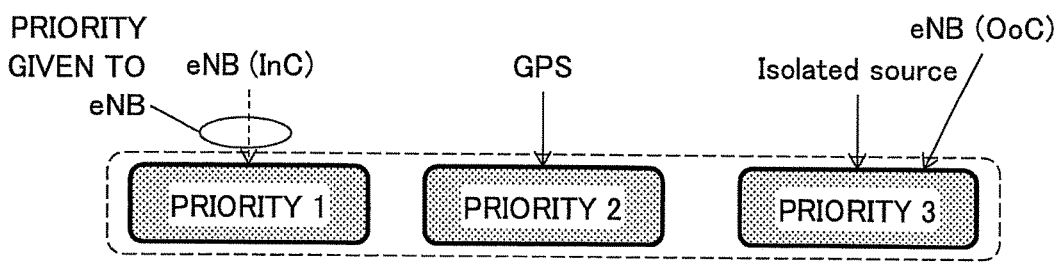
FIG. 17A is a diagram illustrating an example of the correspondence relationship between the synchronization source and the SLSS.

In the example of FIG. 17A, when the base station eNB indicates that the SS is to be preferentially used as a synchronization source within the coverage, the "eNB (InC)" is "priority 1" and is associated with the type of SLSS of "priority 1". Further, the "GPS" is "priority 2" and is associated with the type of SLSS of "priority 2". Likewise, the "eNB (OoC)" is "priority 3" and is associated with the type of SLSS of "priority 3". Moreover, the "isolated source" is "priority 3" and is associated with the type of SLSS of "priority 3".

In the example of FIG. 17A, when the base station eNB indicates that the SS is to be preferentially used as a synchronization source within the coverage, the user apparatus UE synchronized with the SS transmitted from the base station eNB within coverage transmits an SLSS of the type corresponding to "priority 1". The user apparatus UE synchronized with the SLSS (the same as the SLSS of the type corresponding to "priority 1" in the example of FIG. 17A) transmitted from the user apparatus UE that uses the SS as the synchronization source within the coverage transmits an SLSS of a type corresponding to "priority 3". When the user apparatus UE synchronized with the GPS transmits an SLSS, the user apparatus UE transmits an SLSS of the type corresponding to "priority 2". When the user apparatus UE synchronized with the clock inside the user apparatus UE transmits an SLSS, the user apparatus UE transmits an SLSS of the type corresponding to "priority 3".

Figure 17B:
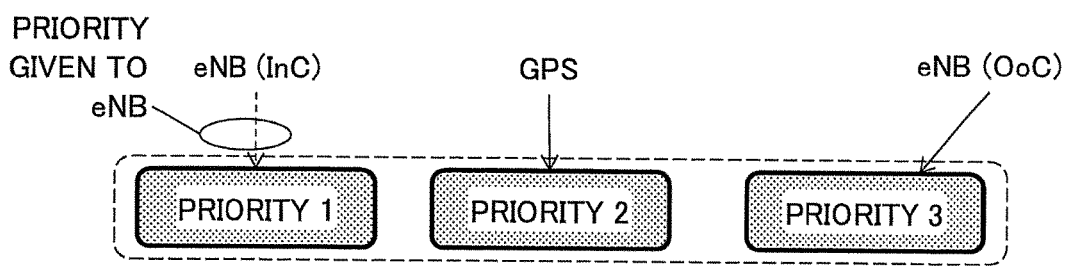
FIG. 17B is a diagram illustrating an example of the correspondence relationship between the synchronization source and the SLSS.

In the example of FIG. 17B, when the base station eNB indicates that the SS is to be preferentially used as a synchronization source within the coverage, the "eNB (InC)" is "priority 1" and is associated with the type of SLSS of "priority 1". Further, the "GPS" is "priority 2" and is associated with the type of SLSS of "priority 2". Likewise, the "eNB (OoC)" is "priority 3" and is associated with the type of SLSS of "priority 3".

In the example of FIG. 17B, when the base station eNB indicates that the SS is to be preferentially used as a synchronization source within the coverage, the user apparatus UE synchronized with the SS transmitted from the base station eNB within coverage transmits an SLSS of the type corresponding to "priority 1". The user apparatus UE synchronized with the SLSS (the same as the SLSS of "priority 1" in the example of FIG. 17A) transmitted from the user apparatus UE that uses the SS as the synchronization source within the coverage transmits an SLSS of a type corresponding to "priority 3". When the user apparatus UE synchronized with the GPS transmits an SLSS, the user apparatus UE transmits an SLSS of the type corresponding to "priority 2".

In the example of FIG. 17C, when the base station eNB indicates that the SS is to be preferentially used as a synchronization source within the coverage, the "eNB (InC)" is "priority 1" and is associated with the type of SLSS of "priority 1". When the base station eNB indicates that the GPS is to be preferentially used as the synchronization source within the coverage, the "eNB (InC)" is "priority 3" and is associated with the type of SLSS of "priority 3". Further, the "GPS" is "priority 2" and is associated with the type of SLSS of "priority 2". Likewise, the "eNB (OoC)" is "priority 3" and is associated with the type of SLSS of "priority 3". Moreover, the "isolated source" is "priority 4" and is associated with the type of SLSS of "priority 4".

In the example of FIG. 17C, when the user apparatus UE synchronized with the SS transmitted from the base station eNB within the coverage transmits an SLSS, the user apparatus UE transmits the SLSS of the type corresponding to "priority 1" or "priority 3" in accordance with the indication of the base station eNB. The user apparatus UE synchronized with the SLSS (the same as the SLSS of "priority 1" in the example of FIG. 17C) transmitted from the user apparatus UE that uses the SS as the synchronization source within the coverage transmits an SLSS of a type corresponding to "priority 3". When the user apparatus UE synchronized with the GPS transmits an SLSS, the user apparatus UE transmits an SLSS of the type corresponding to "priority 2". When the user apparatus UE synchronized with the clock inside the user apparatus UE transmits an SLSS, the user apparatus UE transmits an SLSS of the type corresponding to "priority 4".

In the example of FIG. 17D, when the base station eNB indicates that the SS is to be preferentially used as a synchronization source within the coverage, the "eNB (InC)" is "priority 1" and is associated with the type of SLSS of "priority 1". When the base station eNB indicates that the GPS is to be preferentially used as the synchronization source within the coverage, the "eNB (InC)" is "priority 3" and is associated with the type of SLSS of "priority 3". Further, the "GPS" is "priority 2" and is associated with the type of SLSS of "priority 2". Likewise, the "eNB (OoC)" is "priority 4" and is associated with the type of SLSS of "priority 4". Moreover, the "isolated source" is "priority 4" and is associated with the type of SLSS of "priority 4".

In the example of FIG. 17D, when the user apparatus UE synchronized with the SS transmitted from the base station eNB within the coverage transmits an SLSS, the user apparatus UE transmits the SLSS of the type corresponding to "priority 1" or "priority 3" in accordance with the indication of the base station eNB. The user apparatus UE synchronized with the SLSS (the same as the SLSS of the type "priority 1" in the example of FIG. 17D) transmitted from the user apparatus UE that uses the SS as the synchronization source within the coverage transmits an SLSS of the type corresponding to "priority 4". When the user apparatus UE synchronized with the GPS transmits an SLSS, the user apparatus UE transmits an SLSS of the type corresponding to "priority 2". When the user apparatus UE synchronized with the clock inside the user apparatus UE transmits an SLSS, the user apparatus UE transmits an SLSS of the type corresponding to "priority 4".

In the example of FIG. 17E, when the base station eNB indicates that the SS is to be preferentially used as a synchronization source within the coverage, the "eNB (InC)" is "priority 1" and is associated with the type of SLSS of "priority 1". When the base station eNB indicates that the GPS is to be preferentially used as the synchronization source within the coverage, the "eNB (InC)" is "priority 3" and is associated with the type of SLSS of "priority 3". Further, the "GPS" is "priority 2" and is associated with the type of SLSS of "priority 2". Likewise, the "eNB (OoC)" is "priority 4" and is associated with the type of SLSS of "priority 4".

In the example of FIG. 17E, when the user apparatus UE synchronized with the SS transmitted from the base station eNB within the coverage transmits an SLSS, the user apparatus UE transmits the SLSS of the type corresponding to "priority 1" or "priority 3" in accordance with the indication of the base station eNB. The user apparatus UE synchronized with the SLSS (the same as the SLSS of "priority 1" in the example of FIG. 17E) transmitted from the user apparatus UE that uses the SS as the synchronization source within the coverage transmits an SLSS of the type corresponding to "priority 4". When the user apparatus UE synchronized with the GPS transmits an SLSS, the user apparatus UE transmits an SLSS of the type corresponding to "priority 2".

The association between the synchronization source and the type of the SLSS is described above with reference to FIGS. 16A to 16D and FIGS. 17A to 15E.

As described below, a case where the SLSS transmitted from the user apparatus UE using the GPS as the synchronization source within the area of the GPS signal is used as the synchronization source may be defined with respect to the GPS in a manner similar to the SS. In the following description, the "GPS (InC)" indicates a case where a GPS signal is directly used as a synchronization source, the "GPS (OoC)" indicates a case where the SLSS transmitted from the user apparatus UE that uses a GPS signal as a synchronization source in the GPS area is used as the synchronization source.

Figure 18:
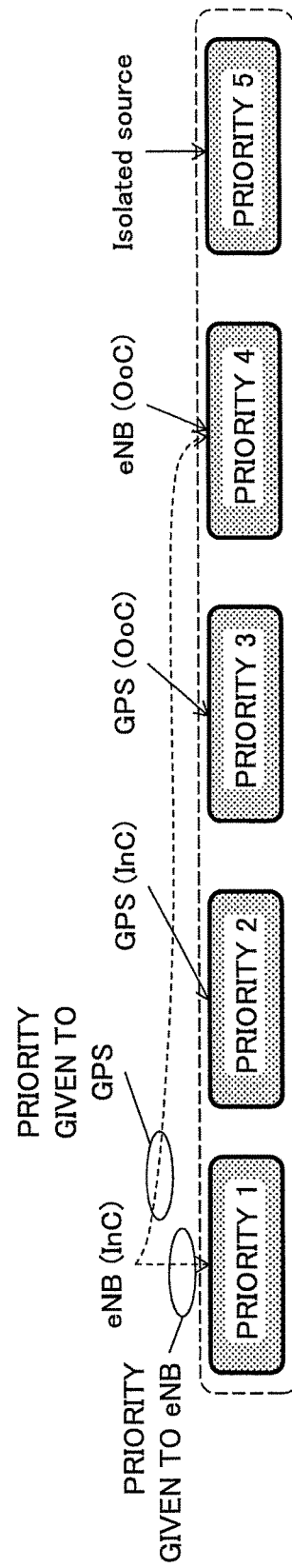
FIG. 18 is a diagram illustrating an example of the correspondence relationship between the synchronization source and the SLSS.

In the example of FIG. 18, when the base station eNB indicates that the SS is to be preferentially used as a synchronization source within the coverage, the "eNB (InC)" is "priority 1" and is associated with the type of SLSS of "priority 1". When the base station eNB indicates that the GPS is to be preferentially used as the synchronization source within the coverage, the "eNB (InC)" is "priority 4" and is associated with the type of SLSS of "priority 4". The "GPS (InC)" is "priority 2" and is associated with the type of SLSS of "priority 2", and the "GPS (OoC)" is "priority 3" and is associated with the type of SLSS of "priority 3". Likewise, the "eNB (OoC)" is "priority 4" and is associated with the type of SLSS of "priority 4". Moreover, the "isolated source" is "priority 4" and is associated with the type of SLSS of "priority 4".

In the example of FIG. 18, when the user apparatus UE synchronized with the SS transmitted from the base station eNB within the coverage transmits an SLSS, the user apparatus UE transmits the SLSS of the type corresponding to "priority 1" or "priority 4" in accordance with the indication of the base station eNB. The user apparatus UE synchronized with the SLSS (the same as the SLSS of the type "priority 1" in the example of FIG. 18) transmitted from the user apparatus UE that uses the SS as the synchronization source within the coverage transmits an SLSS of the type corresponding to "priority 4". When the user apparatus UE synchronized with the GPS transmits an SLSS, the user apparatus UE transmits an SLSS of the type corresponding to "priority 2". The user apparatus UE synchronized with the SLSS (the same as the SLSS of the type "priority 2" in the example of FIG. 18) transmitted from the user apparatus UE that uses the GPS as the synchronization source within the GPS area transmits an SLSS of the type corresponding to "priority 3". When the user apparatus UE synchronized with the clock inside the user apparatus UE transmits an SLSS, the user apparatus UE transmits an SLSS of the type corresponding to "priority 5". The user apparatus UE that has received two or more SLSSs outside the coverage among the SLSSs of "priority 1" to "priority 5" synchronizes with the SLSS with the highest priority.

[Association Between Type of SLSS and Priority]

In the above description, one SLSS type is associated with one priority degree as illustrated in FIG. 13; however, two or more types of SLSS may be associated with one priority degree.

As a specific example, when SLSS_A and SLSS_B are defined as SLSSs of "priority 1," and correspondence between a synchronization source and a priority degree of each SLSS is to be further defined, "eNB (InC)" may be associated with the SLSS_A among the SLSSs of "priority degree 1," and "GPS" may be associated with the SLSS_B among the SLSSs of "priority degree 1." The user apparatus UE that has received both the SLSS_A and SLSS_B with the same priority may be synchronized with any SLSS or the SLSS with favorable reception quality.

[Method for Preventing Priority Determined by the Indication of the Base Station from being Reflected on User Apparatus Outside the Coverage]

In the example of FIGS. 14A to 14C, 15A to 15D, 16A to 16D, 17A to 17E, and 18, the priority indicated by the base station eNB is reflected on the priority of the SLSS. In the example of FIG. 15C, when the base station eNB indicates that the SS is to be preferentially used as a synchronization source within the coverage, the "eNB (InC)" is "priority 1" and is associated with the type of SLSS of "priority 1", and the GPS is "priority 2" and is associated with the type of SLSS of "priority 2". That is, the priority of the SLSS transmitted from the user apparatus UE using the SS as the synchronization source is higher than that of the SLSS transmitted by the user apparatus UE using the GPS as the synchronization source. Conversely, when the base station eNB indicates that the GPS is to be preferentially used as a synchronization source within the coverage, the "eNB (InC)" is "priority 3" and is associated with the type of SLSS of "priority 3", and the GPS is "priority 2" and is associated with the type of SLSS of "priority 2". That is, the priority of the SLSS transmitted from the user apparatus UE using the GPS as the synchronization source is higher than that of the SLSS transmitted by the user apparatus UE using the SS as the synchronization source.

However, it is also assumed that there is no need to reflect the priority of the synchronization source within the coverage on the priority of the synchronization source outside the coverage.

Thus, one-to-one correspondence between each synchronization source and the type of the SLSS may be statically defined in advance. Then, the user apparatus UE may determine the priority of the synchronization source (the SS and the GPS) in accordance with an indication from the base station eNB within the coverage. Outside the coverage, for example, the user apparatus UE may perform synchronization in accordance with the priority information illustrated in FIG. 19A. Note that in FIG. 19A, the "SLSS (GPS sync. relay)" indicates the SLSS transmitted by the user apparatus UE using SLSS (GPS sync.) as the synchronization source, and "SLSS (NW sync. relay)" indicates the SLSS transmitted by a user apparatus UE that uses SLSS (NW sync.) as a synchronization source.

As a result, even if the base station eNB indicates that the SS is to be preferentially used as the synchronization source within the coverage, the user apparatus UE outside the coverage may be synchronized with the SLSS (GPS sync. or GPS sync. relay) transmitted from the user apparatus UE that uses the GPS signal or the GPS as the synchronization source, in accordance with FIG. 19A.

The priority information illustrated in FIG. 19A is an example, and simplified priority information may be used depending on network operation, as illustrated in FIG. 19B. For example, in a carrier operated so as not to allow synchronization with the SS outside the coverage, the simplified priority information illustrated in FIG. 19B may be used. The same priority may be given to the SLSS where the GPS serves as the synchronization source and to the SLSS where the SS serves as the synchronization source. In the example of FIG. 19B, only three types of priority groups are defined. Accordingly, three types of priority groups defined for the usual LTE may be applied as they are, for which the SLSS sequences and identifiers in the PSBCs are used. By avoiding to define unnecessary priority degrees, selection of an appropriate synchronization source corresponding to a received level and/or quality of an SLSS and/or a PSBCH can be ensured, even if there is provided finer distinguishing capability.

The determination of the priority based on the indication of the base station and the method of reflecting the priority on the user apparatus outside the coverage are described above.

(Subframe in which SLSS is Transmitted)

Figure 20A:
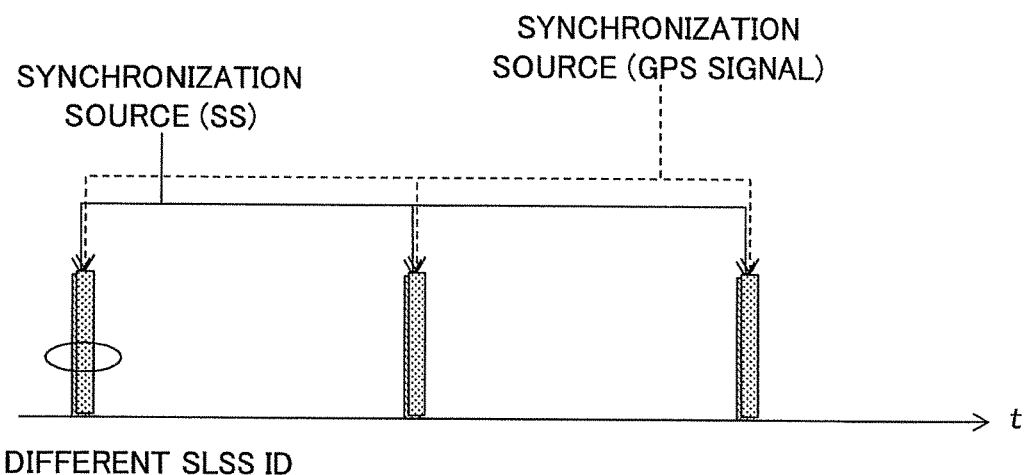
FIG. 20A is a diagram illustrating an example of a subframe in which an SLSS is transmitted.

The user apparatus UE may transmit SLSSs with different synchronization sources in the same subframe. The example of FIG. 20A depicts a case where the SLSS using the GPS as the synchronization source and the SLSS using the SS as the synchronization source are transmitted in the same subframe. Note that, in order for the user apparatus UE that receives a plurality of SLSSs in the same subframe to distinguish the respective SLSSs, it is necessary that SLIDs (SLSSIDs) have values that are different from each other. The values of the SLIDs may be configured by the base station eNB in the user apparatus UE.

Figure 20B:
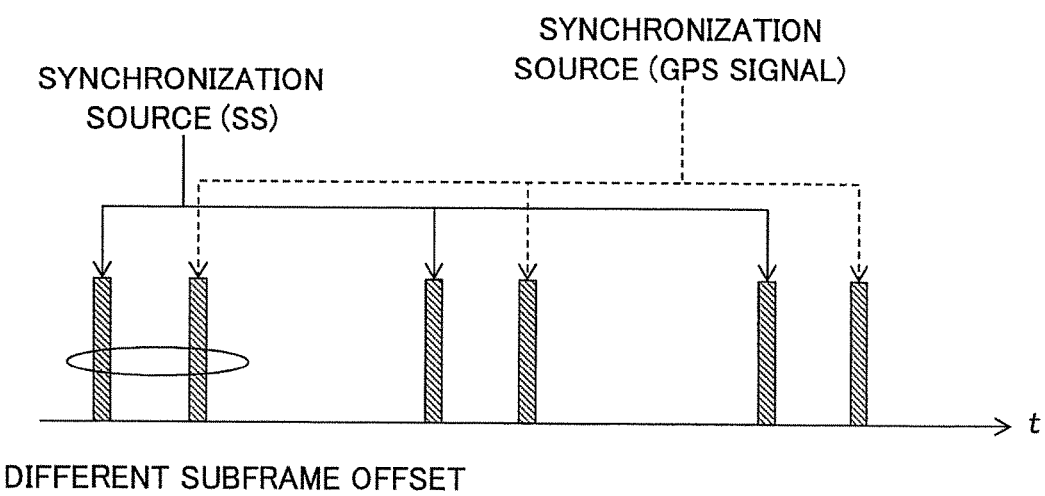
FIG. 20B is a diagram illustrating an example of the subframe in which the SLSS is transmitted.

The user apparatus UE may transmit SLSSs using different synchronization sources in different subframes in accordance with offset values previously configured to be different values based on the respective synchronization sources. The example of FIG. 20B depicts a case where the SLSS using the GPS as the synchronization source and the SLSS using the SS as the synchronization source are transmitted in the different subframes. The offset values may be configured by the base station eNB in the user apparatus UE.

(SLSS Synchronization During Multiple Carrier Operation)

When a D2D communication is performed using multiple carriers, a synchronization priority between carriers may be defined such that a specific carrier may be preferentially used as a synchronization source, for example. That is, the synchronization operation is performed by applying the above-described priority within the carrier (the process described with reference to FIGS. 13 to 18) to a carrier with a high priority. This synchronization reference is also applied to a carrier other than the carrier on which the synchronization signal is received (e.g., a carrier included in a preconfigured synchronization carrier list). By such an operation, it becomes unnecessary to search for synchronization sources on all carriers, and inter-carrier synchronization can be achieved.

<Functional Configuration>

The following illustrates examples of functional configurations of the user apparatus UE and the base station eNB that perform the operations of the above-described embodiment.

(User Apparatus)

Figure 21:
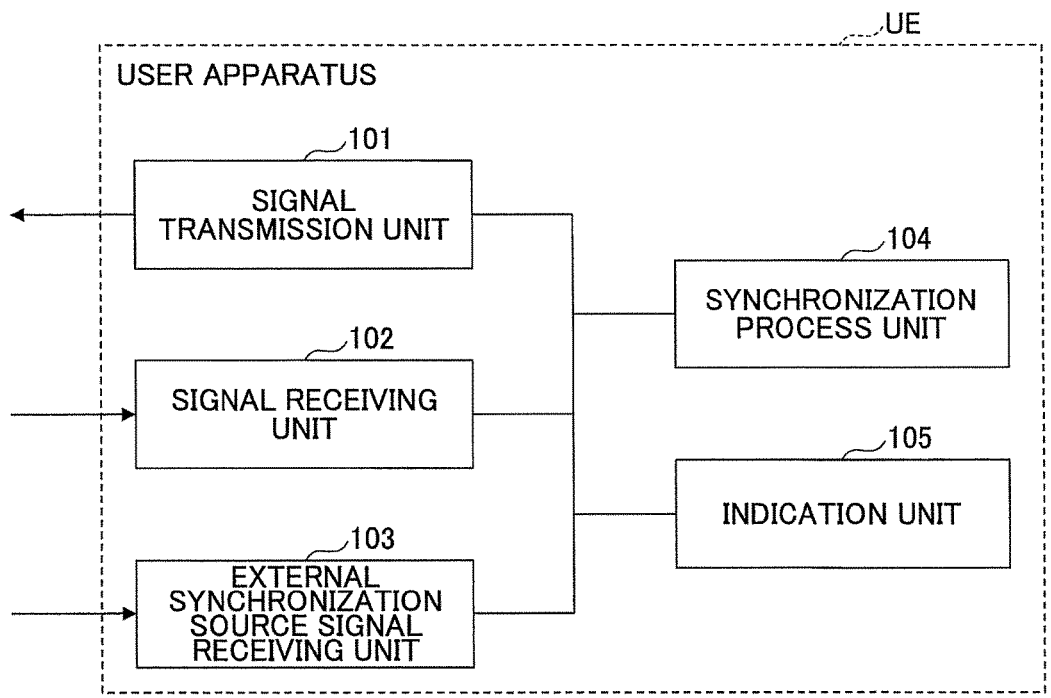
FIG. 21 is a diagram illustrating an example of a functional configuration of a user apparatus according to the embodiment.

FIG. 21 is a diagram illustrating an example of a functional configuration of a user apparatus according to an embodiment. As illustrated in FIG. 21, the user apparatus UE includes a signal transmission unit 101, a signal receiving unit 102, an external synchronization source signal receiving unit 103, a synchronization process unit 104, and an indication unit 105. Note that FIG. 21 merely illustrates the functional configuration particularly related to the embodiment of the present invention in the user apparatus UE, and the user apparatus UE may also include not-illustrated functions for performing, at the least, operations conforming to LTE. The functional configuration illustrated in FIG. 21 is merely an example. Any functional division and any names of the functional components may be applied insofar as the operations according to the present embodiment may be executed.

The signal transmission unit 101 includes a function to generate various types of signals of the physical layer from the signals of a higher layer to be transmitted from the user apparatus UE and to wirelessly transmit the generated signals. The signal transmission unit 101 further includes a function to transmit a D2D signal and a transmission function for the cellular communication. The signal transmitting unit 101 further includes a function to transmit SLSS and PSBCH to the other user apparatus UE based on a command from the indication unit 105.

Based on the radio resource allocation information, when the type of the user apparatus UE itself is the RSU, the signal transmission unit 101 may transmit the D2D signal in a period during which the RSU is allowed to transmit the D2D signal; and when the type of the user apparatus UE itself is a user apparatus UE other than the RSU, the signal transmission unit 101 may transmit the D2D signal in a period during which the user apparatus UE other than the RSU is allowed to transmit the D2D signal.

The signal transmission unit 101 further includes a function to transmit the SLSS with priority corresponding to a synchronization source synchronized by the synchronization process unit 104. For example, when the synchronization process unit 104 is synchronized with the signal of an external synchronization source, the signal transmission unit 101 may transmit SLSS with priority corresponding to the external synchronization source; and when the synchronization process unit 104 is synchronized with SS, the signal transmission unit 101 may transmit SLSS with priority corresponding to the SS.

The signal receiver 102 includes a function to wirelessly receive various signals from another user apparatus UE or the base station eNB, and to obtain signals of a higher layer from the received signals of the physical layer. The signal receiving unit 102 further includes a function to receive the D2D signal and a receiving function for the cellular communication. The signal receiving unit 102 further includes a function to receive, from the base station eNB, various types of information (priority information, synchronization information, an identifier indicating the type of SLSS, information to be included in the PSBCH, radio resource allocation information, transmission permission information, etc.) to be used for performing the synchronization process.

The external synchronization source signal receiving unit 103 receives a signal (GPS signal, etc.) of an external synchronization source. The external synchronization source signal receiving unit 103 may further include a function to generate PPS and output the generated PPS.

The synchronization process unit 104 performs radio frame synchronization and frequency synchronization using a signal of the external synchronization source, SS or SLSS. The synchronization processing unit 104 may perform synchronization using one of the signal of the external synchronization source, the SS or the SLSS, in accordance with the priority information.

The synchronization process unit 104 may perform the radio frame synchronization and the frequency synchronization using the SS transmitted in a cell of a plurality of cells that is allowed to be used for the radio frame synchronization and the frequency synchronization. The synchronization process unit 104 may perform radio frame synchronization and frequency synchronization, using a signal of the external synchronization source when the synchronization process unit 104 is allowed to perform the radio frame synchronization and the frequency synchronization using the signal of the external synchronization source.

The synchronization processing unit 104 further include a function to perform the radio frame synchronization and the frequency synchronization using the signal of the external synchronization source or the SS based on a command from the base station. The synchronization process unit 104 may perform radio frame synchronization and frequency synchronization using the type of the SLSS with the higher priority among the two or more types of SLSSs received by the signal receiving unit 102 in accordance with the priority information indicating the priority order of the the two or more types of SLSSs (or in accordance with the priority of the two or more types of SLSSs) outside the external synchronization source receivable area and outside the coverage of the base station. The synchronization process unit 104 may select SLSSs with reception quality (e.g., the reception quality of the DM-RS) that is greater than or equal to a predetermined threshold, among the two or more types of SLSSs received by the signal reception unit 102, and may perform radio frame synchronization and frequency synchronization using the type of the SLSS with the high priority among the selected SLSSs.

The indication unit 105 includes a function to indicate to the signal transmission unit 101 that the signal transmission unit 101 transmits the SLSS to another user apparatus UE when a predetermined condition is satisfied. Note that the indication unit 105 may indicate to the signal transmission unit 101 that the signal transmission unit 101 transmits SLSS (synchronized with an external synchronization source) or SLSS (NW sync.) when the SLSS from the other user apparatus UE received by the signal receiving unit 102 is SLSS (No sync.), and when the synchronization process unit 104 performs the radio frame synchronization and the frequency synchronization using one of the signal of the external synchronization source and the SS.

The indication unit 105 may compare the type of the user apparatus UE itself to the transmission permission information that associates the type of the user apparatus UE with information indicating whether transmission of the SLSS is allowed. Upon determining that transmission of the SLSS is allowed, the indication unit 105 may indicate to the signal transmission unit 101 to transmit the SLSS. For example, the indication unit 105 may indicate to the the signal transmission unit 101 to transmit the SLSS only when the type of the user apparatus UE itself is the RSU.

Note that the indication unit 105 may be included in the signal transmission unit 101, and the external synchronization source signal receiving unit 103 may be included in the signal receiving unit 102.

(Base Station)

Figure 22:
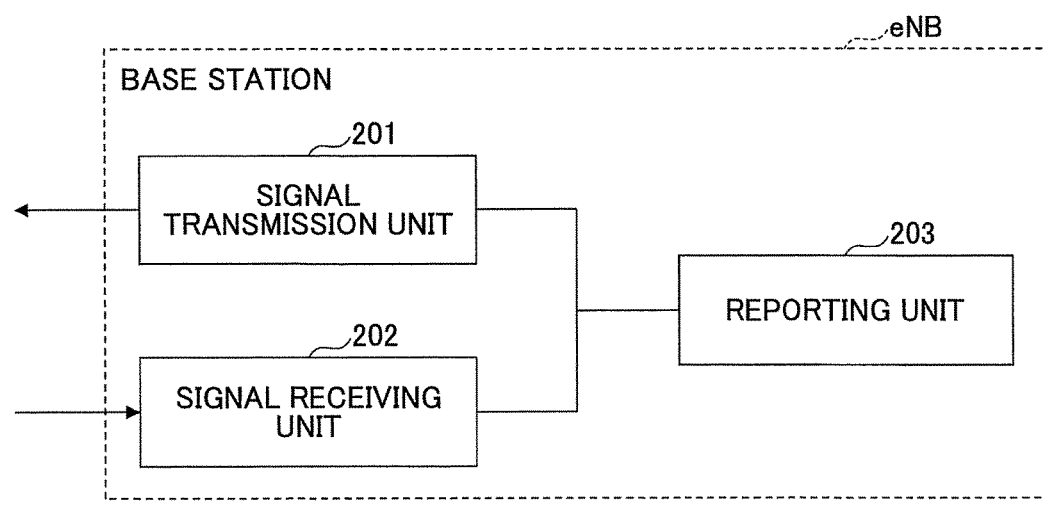
FIG. 22 is a diagram illustrating an example of a functional configuration of a base station according to the embodiment.

FIG. 22 is a diagram illustrating an example of a functional configuration of a base station according to an embodiment. As illustrated in FIG. 22, the base station eNB includes a signal transmission unit 201, a signal receiving unit 202, and a reporting unit 203. Note that FIG. 22 merely illustrates the functional configuration particularly related to the embodiment of the present invention in the base station eNB, and the base station eNB may also include not-illustrated functions for performing, at the least, operations conforming to LTE. The functional configuration illustrated in FIG. 22 is merely an example. Any functional division and any names of the functional components may be applied insofar as the operations according to the present embodiment may be executed.

The signal transmission unit 201 includes a function to generate various types of signals of the physical layer from the signals of a higher layer to be transmitted from the base station eNB and to wirelessly transmit the generated signals. The signal receiving unit 202 includes a function to wirelessly receive various signals from the user apparatus UE and to obtain signals of a higher layer from the received signals of the physical layer.

The reporting unit 203 transmits, to the user apparatus UE, various types of information (priority information, synchronization information, an identifier indicating the type of SLSS, information to be included in the PSBCH, radio resource allocation information, transmission permission information, etc.) used for performing, by the user apparatus UE, the synchronization process, via a RRC signal, broadcast information (SIB), and a control signal of layer 1 or layer 2. Further, the reporting unit 203 indicates, to the user apparatus UE within the coverage, the priority as to whether to preferentially use the GPS as the synchronization source or whether to preferentially use the SS as the synchronization source.

Each of the above-described functional configurations of the user apparatus UE and the base station eNB may be entirely implemented by a hardware circuit (for example, one IC chip or multiple IC chips). Alternatively, a part of the functional configuration may be formed of a hardware circuit, and the remaining part may be implemented by a CPU and a program.

(User Apparatus)

Figure 23:
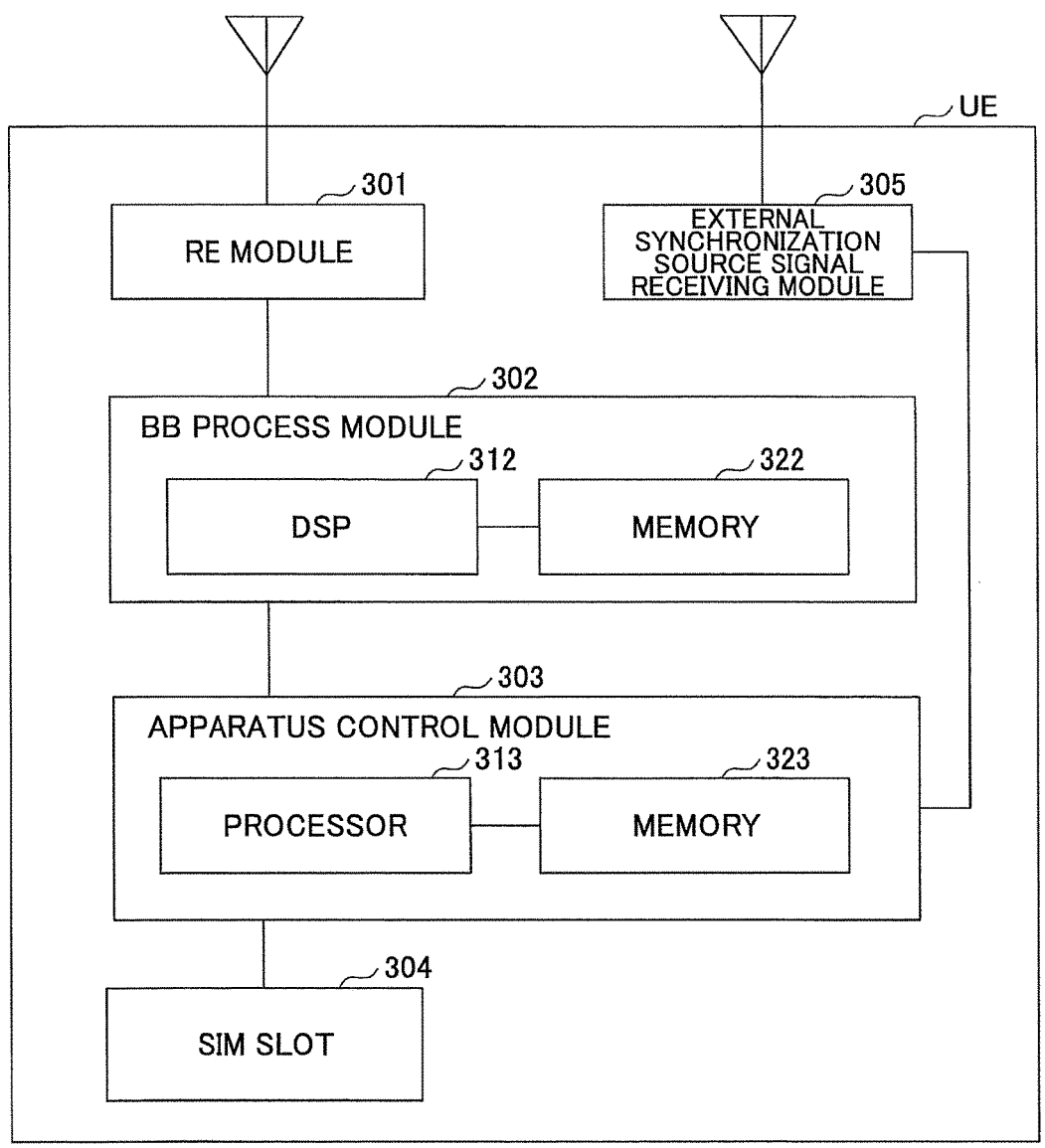
FIG. 23 is a diagram illustrating an example of a hardware configuration of the user apparatus according to the embodiment.

FIG. 23 is a diagram illustrating an example of a hardware configuration of the user apparatus according to an embodiment. FIG. 23 illustrates a configuration closer to the implemented example than the example illustrated in FIG. 21. As illustrated in FIG. 23, the user apparatus UE includes an RE (Radio Equipment) module 301 configured to perform a process relating to radio signals, a BB (Base Band) process module 302 configured to perform a baseband signal process, an apparatus control module 303 configured to perform a process of a higher layer, a SIM slot 304 that is an interface for accessing a SIM card, and an external synchronization source signal receiving module 305 configured to receive an external synchronization source signal.

The RE module 301 performs D/A (Digital-to-Analog) conversion, modulation, frequency conversion, power amplification, etc., on the digital baseband signal received from the BB process module 302 to generate a radio signal to be transmitted from an antenna. The RE module 301 also performs frequency conversion, A/D (Analog to Digital) conversion, demodulation, etc., on the received radio signal to generate a digital baseband signal to transfer the generated digital baseband signal to the BB process module 302. The RE module 301 may include, for example, a part of the signal transmission unit 101 and a part of the signal receiving unit 102 illustrated in FIG. 21.

The BB process module 302 is configured to perform a process of mutually converting the IP packet and the digital baseband signal. A DSP (Digital Signal Processor) 312 is a processor configured to perform a signal process in the BB process module 302. The memory 322 is used as a work area of the DSP 312. The RE module 301 may, for example, include a part of the signal transmission unit 101, a part of the signal receiving unit 102, and the synchronization process unit 104 illustrated in FIG. 21.

The apparatus control module 303 is configured to perform an IP layer protocol process, various types of application processes, and the like. The processor 313 is configured to perform a process performed by the apparatus control module 303. The memory 323 is used as a work area of the processor 313. The processor 313 reads data from and writes data into the SIM via the SIM slot 304. The apparatus control module 303 includes, for example, the indication unit 105 illustrated in FIG. 21.

The external synchronization source signal receiving module 305 receives the GPS signal, and performs demodulation, etc., of the received GPS signal. The external synchronization source signal receiving module 305 includes the external synchronization source signal receiving unit 103 illustrated in FIG. 21.

(Base Station)

Figure 24:
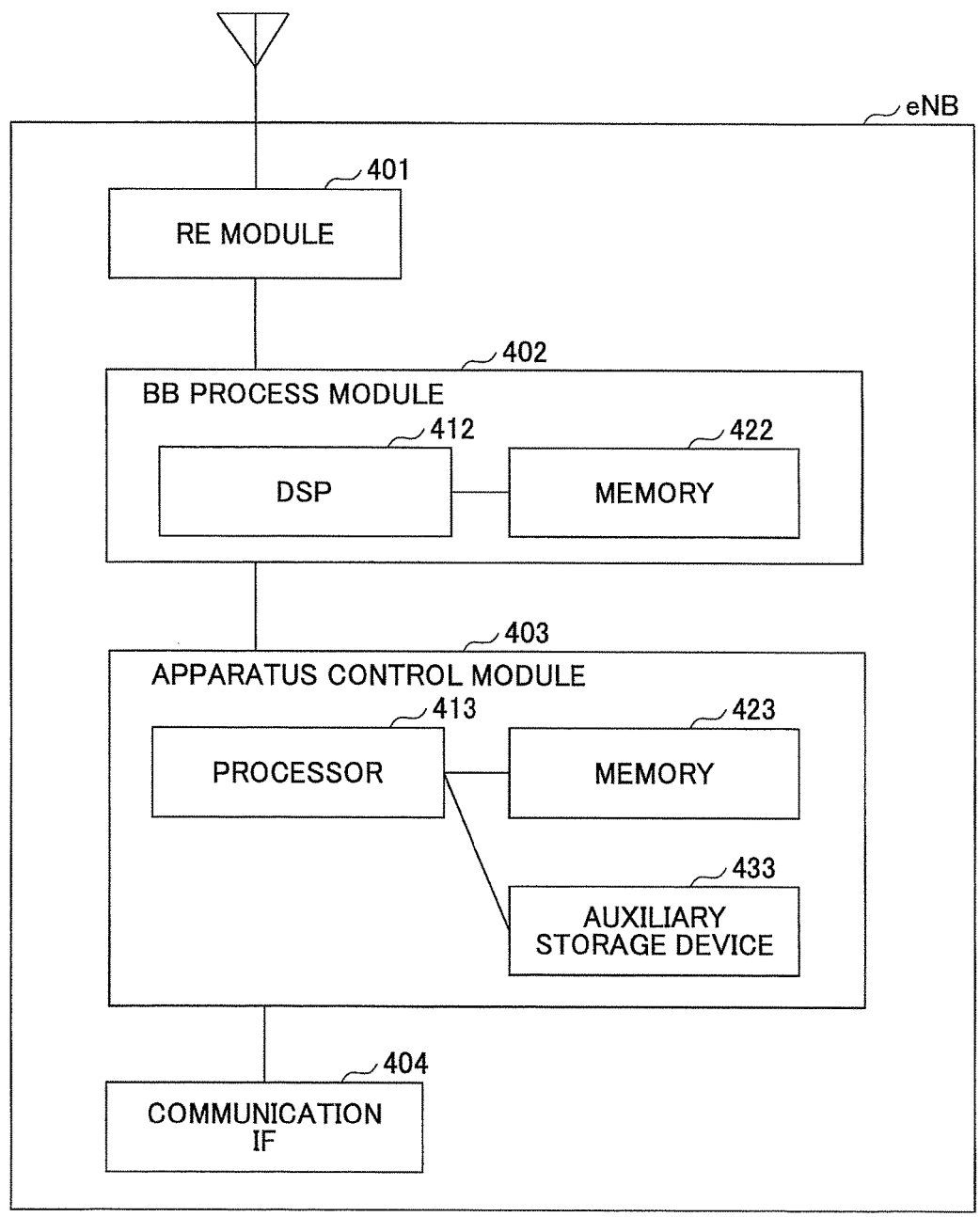
FIG. 24 is a diagram illustrating an example of a hardware configuration of the base station according to the embodiment.

FIG. 24 is a diagram illustrating an example of a hardware configuration of the base station according to the embodiment. FIG. 24 illustrates a configuration closer to the implemented example than the example illustrated in FIG. 22. As illustrated in FIG. 24, the base station eNB includes an RE module 401 configured to perform a process relating to radio signals, a BB process module 402 configured to perform a baseband signal process, an apparatus control module 403 configured to perform a process of a higher layer and the like, and a communication IF 404 that is an interface for connecting to a network.

The RE module 401 performs D/A conversion, modulation, frequency conversion, power amplification, etc., on the digital baseband signal received from the BB process module 402 to generate a radio signal to be transmitted from an antenna. The RE module 401 also performs frequency conversion, A/D conversion, demodulation, etc., on the received radio signal to generate a digital baseband signal to transfer the generated digital baseband signal to the BB process module 402. The RE module 401 may include, for example, a part of the signal transmitter 201 and a part of the signal receiving unit 202 illustrated in FIG. 22.

The BB process module 402 is configured to perform a process of mutually converting the IP packet and the digital baseband signal. A DSP 412 is a processor configured to perform a signal process in the BB process module 402. A memory 422 is used as a work area of the DSP 412. The BB process module 402 includes, for example, a part of the signal transmission unit 201, a part of the signal receiving unit 202, and a part of the reporting unit 203 illustrated in FIG. 22.

The apparatus control module 403 is configured to perform an IP layer protocol process, an OAM (Operation and Maintenance) process, etc. A processor 413 is configured to perform a process performed by the apparatus control module 403. A memory 423 is used as a work area of the processor 413. An auxiliary storage device 433 may, for example, be an HDD or the like, and is configured to store various configuration information, etc., for the base station eNB itself to operate. The apparatus control module 403 includes, for example, a part of the reporting unit illustrated in FIG. 22.

CONCLUSION

According to the above-described embodiment, there is provided a user apparatus of a radio communication system supporting D2D communication, the user apparatus including a receiver configured to receive a signal of an external synchronization source, a synchronization signal transmitted from a base station, or a synchronization signal transmitted from another user apparatus; and a synchronization processor configured to execute, in accordance with priority information indicating priority order of signals used for synchronization, radio frame synchronization and frequency synchronization using any one of the signal of the external synchronization source, the synchronization signal transmitted from the base station, or the synchronization signal transmitted from the other user apparatus, which is received by the receiver. With this user apparatus UE, a technique is provided that allows, in D2D communication, a synchronization process using an external synchronization source.

Further, there may be provided the user apparatus including a transmitter configured to transmit a D2D signal, wherein, when the synchronization signal from the other user apparatus received by the receiver is a synchronization signal indicating that no synchronization is established with the signal of the external synchronization source or the synchronization signal transmitted from the base station, and when the synchronization processor executes the radio frame synchronization and the frequency synchronization using any one of the signal of the external synchronization source or the synchronization signal transmitted from the base station, which is received by the receiver, the transmitter is configured to transmit a synchronization signal indicating that the synchronization is established with the signal of the external synchronization source or the synchronization signal transmitted from the base station. As a result, the user apparatus UE transmitting the SLSS (No sync.) can establish synchronization with the SLSS (synchronized with the external synchronization source) or the SLSS (NW sync.), and a precision of the synchronization can be enhanced. Namely, a highly accurate synchronized state is related to respective user apparatuses UE within the radio communication system.

When a type of the user apparatus is an RSU, the transmitter may transmit the synchronization signal, and, when the type of the user apparatus is a type other than the RSU, the transmitter may not transmit the synchronization signal. As a result, only the RSU that is able to transmit a highly precise synchronization signal is to transmit the synchronization signal, so that the synchronization precision can be enhanced in the whole radio communication system.

Further, based on a time included in the signal of the external synchronization source and radio resource allocation information that associates, among radio resources with which the D2D signal can be transmitted, a first time interval during which an RSU is allowed to transmit the D2D signal with a second time interval during which a user apparatus other than the RSU is allowed to transmit the D2D signal, when a type of the user apparatus is the RSU, the transmitter may transmit the D2D signal in the first time interval, and when the type of the user apparatus is other than the RSU, the transmitter may transmit the D2D signal in the second time interval. As a result, a radio resource can be separated that is used by the RSU that may transmit a signal with high importance, so that a likelihood that the signal with high importance interferes with another signal can be reduced.

The receiver may receive a plurality of synchronization signals transmitted in a respective plurality of cells, and the synchronization processor may execute the radio frame synchronization and the frequency synchronization using a synchronization signal transmitted in a cell of the plurality of cells that is allowed to be used for the radio frame synchronization and the frequency synchronization. As a result, for example, when a cell is provided that allows only the V2X communication, a likelihood can be eliminated such that a synchronization signal in a cell that is operated in a state in which not synchronization is established with an external synchronization source is erroneously used for synchronization.

Further, upon detecting that execution of the radio frame synchronization and the frequency synchronization using the signal of the external synchronization source is allowed, the synchronization processor may execute the radio frame synchronization and the frequency synchronization using the signal of the external synchronization source. As a result, for example, in a specific area where use of the GPS is disallowed, the user apparatus UE can be caused not to execute synchronization with the external source.

Further, according to the above-described embodiment, there is provided a user apparatus of a radio communication system supporting D2D communication, the user apparatus including a receiver configured to receive a signal of an external synchronization source, a synchronization signal transmitted from a base station, or a plurality of types of synchronization signals transmitted from another user apparatus; and a synchronization processor configured to execute radio frame synchronization and frequency synchronization, wherein, within a coverage of the base station, the synchronization processor is configured to execute, based on a command from the base station, the radio frame synchronization and the frequency synchronization using the signal of the external synchronization source or the synchronization signal transmitted from the base station, which is received by the receiver, and wherein, outside an area of the external synchronization source and outside the coverage of the base station, the synchronization processor is configured to execute, in accordance with priority information indicating priority order of the plurality of types of synchronization signals, the radio frame synchronization and the frequency synchronization using a type of synchronization signal with high priority of the plurality of types of synchronization signals received by the receiver. With this user apparatus UE, a technique is provided that allows, in D2D communication, a synchronization process using an external synchronization source.

The user apparatus may include a transmitter configured to transmit a synchronization signal toward another user apparatus. When the synchronization processor is synchronized with the signal of the external synchronization source, the transmitter may transmit a synchronization signal with the priority order corresponding to the external synchronization source, and when the synchronization processor is synchronized with the synchronization signal transmitted from the base station, the transmitter may transmit a synchronization signal with the priority order corresponding to the synchronization signal transmitted from the base station. As a result, an indication of the priority made by the base station eNB within the coverage (indication as to whether synchronization is to be established with the SS or synchronization is to be established with the external synchronization source) can be reflected on the user apparatus UE located outside the coverage.

Further, according to the above-described embodiment, there is provided a synchronization method executed by a user apparatus of a radio communication system supporting D2D communication, the synchronization method including a receiving step of receiving a signal of an external synchronization source, a synchronization signal transmitted from a base station, or a synchronization signal transmitted from another user apparatus; and a synchronization step of executing, in accordance with priority information indicating priority order of signals used for synchronization, radio frame synchronization and frequency synchronization using any one of the signal of the external synchronization source, the synchronization signal transmitted from the base station, or the synchronization signal transmitted from the other user apparatus. With this synchronization method, a technique is provided that allows, in D2D communication, a synchronization process using an external synchronization source.

Supplement to the Embodiment

When making a type of each SLSS identifiable by the sequence, the user apparatus UE may be configured not to transmit the PSBCH.

Synchronization of radio frames may be referred to as time synchronization (Time Synchronization).

The physical channel names employed in the description of the above embodiments are merely examples, and the present embodiment may also be applied to other physical channels.

The D2D signal, the RRC signal and the control signal may be a D2D message, an RRC message and a control message, respectively.

The method claims present elements of various steps in a sample order and are not limited to the specific order presented unless explicitly stated in the claims.

As described above, the embodiments of the present invention may be expanded to the LTE (Long Term Evolution), LTE-A (LTE-Advanced), CDMA 2000, UMB (Ultra Mobile Broadband), IEEE 802.11 (Wi-Fi (registered trademark)), IEEE802.16 (WiMAX (registered trademark)), IEEE 802.20, UWB (Ultra-Wideband), Bluetooth (registered trademark) and/or other suitable systems.

A configuration of each of the above-described devices (user apparatus UE/base station eNB) in the embodiment of the present invention may be implemented by, in the device including a CPU and a memory, executing a program by the CPU (processor); may be implemented by hardware, such as a hardware circuit provided with a processing logic described in the embodiment; or may include a mixture of a program and hardware.

The embodiments of the present invention are described above; however, the disclosed invention is not limited to these embodiments, and a person skilled in the art would understand various variations, modifications, replacements, or the like. Specific examples of numerical values have been used for facilitating understanding of the present invention; however, these numerical values are merely examples and, unless otherwise noted, any appropriate values may be used.

In the above description, partitioning of items is not essential to the present invention. Provisions described in more than two items may be combined if necessary. Provisions described in one item may be applied to provisions described in another item (as long as they do not contradict). In a functional block diagram, boundaries of functional units or processing units do not necessarily correspond to physical boundaries of parts. Operations of multiple functional units may be physically performed in a single part, or operations of a single functional unit may be physically performed by multiple parts. The order of steps in the above described sequences and flowcharts according to an embodiment may be changed as long as there is no contradiction. For the sake of convenience, the user apparatus UE and the base station eNB are described by using functional block diagrams. These apparatuses may be implemented by hardware, by software, or by combination of both. The software which is executed by a processor included in a user apparatus UE according to an embodiment and the software which is executed by a processor included in a base station eNB may be stored in a random access memory (RAM), a flash memory, a read-only memory (ROM), an EPROM, an EEPROM, a register, a hard disk drive (HDD), a removable disk, a CD-ROM, a database, a server, or any other appropriate recording medium.

In the above-described embodiments, the SLSS (No sync.) is an example of "a synchronization signal indicating that no synchronization is established with a signal of an external synchronization source or a synchronization signal transmitted from the base station". The SLSS (GPS sync.) or SLSS (NW sync.) is an example of "a synchronization signal indicating that synchronization is established with a signal of an external synchronization source or a synchronization signal transmitted from the base station".

The present application is based on and claims the benefit of priority of Japanese Priority Application No. 2015-159989, filed on Aug. 13, 2015, and Japanese Priority Application No. 2015-218010, filed on Nov. 5, 2015, the entire contents of which are hereby incorporated herein by reference.

LIST OF REFERENCE SYMBOLS

UE user apparatus
eNB base station
101 signal transmission unit
102 signal receiving unit
103 external synchronization source receiving unit
104 synchronization process unit
105 indication unit
201 signal transmission unit
202 signal receiving unit
203 reporting unit
301 RE module
302 BB process module
303 apparatus control module
304 SIM slot
401 RE module
402 BB process module
403 apparatus control module
404 communication IF

The invention claimed is:

1. A user apparatus of a radio communication system supporting Device-to-Device (D2D) communication, the user apparatus comprising:
a receiver configured to receive a signal of an external synchronization source, a synchronization signal transmitted from a base station, or a synchronization signal transmitted from another user apparatus;
a synchronization processor configured to execute, in accordance with priority information indicating priority order of signals used for synchronization, at least one of radio frame synchronization and frequency synchronization using any one of the signal of the external synchronization source, the synchronization signal transmitted from the base station, or the synchronization signal transmitted from the other user apparatus, which is received by the receiver; and
a transmitter configured to transmit a D2D signal,
wherein, when the synchronization signal from the other user apparatus received by the receiver is a synchronization signal indicating that no synchronization is established with the signal of the external synchronization source or the synchronization signal transmitted from the base station, and when the synchronization processor executes at least one of the radio frame synchronization and the frequency synchronization using any one of the signal of the external synchronization source or the synchronization signal transmitted from the base station, which is received by the receiver, the transmitter is configured to transmit a synchronization signal indicating that the synchronization is established with the signal of the external synchronization source or the synchronization signal transmitted from the base station.

2. The user apparatus according to claim 1,
wherein, when a type of the user apparatus is a Road-Side Unit (RSU), the transmitter is configured to transmit the synchronization signal, and
wherein, when the type of the user apparatus is a type other than the RSU, the transmitter is configured not to transmit the synchronization signal.

3. The user apparatus according to claim 1, wherein, based on radio resource allocation information that includes, among radio resources with which the D2D signal can be transmitted, a first offset during which the synchronization signal using Global Navigation Satellite System (GNSS) for executing synchronization can be transmitted and a second offset during which the synchronization signal using a synchronization signal for executing synchronization can be transmitted, the transmitter is configured to transmit the synchronization signal using the GNSS for executing synchronization in the first offset, and the transmitter is configured to transmit the synchronization signal using the synchronization signal for executing synchronization in the second offset.

4. The user apparatus according to claim 1, wherein the receiver is configured to receive a plurality of synchronization signals transmitted in a respective plurality of cells, and
wherein the synchronization processor is configured to execute the radio frame synchronization and the frequency synchronization using a synchronization signal transmitted in a cell of the plurality of cells that is allowed to be used for the radio frame synchronization and the frequency synchronization.

5. The user apparatus according to claim 1,
wherein, upon detecting that execution of the radio frame synchronization and the frequency synchronization using the signal of the external synchronization source is allowed, the synchronization processor is configured to execute the at least one of radio frame synchronization and the frequency synchronization using the signal of the external synchronization source.

6. A user apparatus of a radio communication system supporting Device-to-Device (D2D) communication, the user apparatus comprising:
- a receiver configured to receive a signal of an external synchronization source, a synchronization signal transmitted from a base station, or a plurality of types of synchronization signals transmitted from another user apparatus;
- a transmitter configured to transmit a synchronization signal toward another user apparatus; and
- a synchronization processor configured to execute at least one of radio frame synchronization and frequency synchronization,
- wherein, within a coverage of the base station, the synchronization processor is configured to execute, based on a command from the base station, at least one of the radio frame synchronization and the frequency synchronization using the signal of the external synchronization source or the synchronization signal transmitted from the base station, which is received by the receiver,
- wherein, outside an area of the external synchronization source and outside the coverage of the base station, the synchronization processor is configured to execute, based on priority order of the plurality of types of synchronization signals, at least one of the radio frame synchronization and the frequency synchronization using a type of synchronization signal with high priority of the plurality of types of synchronization signals received by the receiver,
- wherein, when the synchronization processor is synchronized with a signal from an external synchronization source, the transmitter is configured to transmit a synchronization signal associated with the priority order corresponding to the priority order of the external synchronization source, and
- wherein, when the synchronization processor is synchronized with a synchronization signal transmitted from the base station, the transmitter is configured to transmit a synchronization signal associated with the priority order corresponding to the priority order of the synchronization signal transmitted from the base station.

7. A synchronization method executed by a user apparatus of a radio communication system supporting Device-to-Device (D2D) communication, the synchronization method comprising:
- receiving a signal of an external synchronization source, a synchronization signal transmitted from a base station, or a synchronization signal transmitted from another user apparatus;
- executing, in accordance with priority information indicating priority order of signals used for synchronization, at least one of radio frame synchronization and frequency synchronization using any one of the signal of the external synchronization source, the synchronization signal transmitted from the base station, or the synchronization signal transmitted from the other user apparatus; and
- transmitting a D2D signal,
- wherein, when the executing is synchronized with a signal from an external synchronization source, the transmitting transmits a synchronization signal associated with the priority order corresponding to the priority order of the external synchronization source, and
- wherein, when the executing is synchronized with a synchronization signal transmitted from the base station, the transmitting transmits a synchronization signal associated with the priority order corresponding to the priority order of the synchronization signal transmitted from the base station.

* * * * *